US012636786B2

(12) United States Patent
Emacha et al.

(10) Patent No.: US 12,636,786 B2
(45) Date of Patent: May 26, 2026

(54) SYSTEM, METHOD AND DEVICE FOR MANAGING AN AUTONOMOUS ROBOT DELIVERY SYSTEM FOR A BUILDING

(71) Applicant: Earth Robotics, Miami, FL (US)

(72) Inventors: Ismael Emacha, Miami, FL (US); Carlos Jaimes, Miami, FL (US)

( * ) Notice: Subject to any disclaimer, the term of this patent is extended or adjusted under 35 U.S.C. 154(b) by 161 days.

(21) Appl. No.: 17/864,350

(22) Filed: Jul. 13, 2022

(65) Prior Publication Data

US 2023/0017144 A1    Jan. 19, 2023

Related U.S. Application Data

(60) Provisional application No. 63/221,400, filed on Jul. 13, 2021.

(51) Int. Cl.
*B25J 9/16*        (2006.01)
*B25J 11/00*        (2006.01)

(52) U.S. Cl.
CPC ........... *B25J 9/1679* (2013.01); *B25J 9/1653* (2013.01); *B25J 9/1664* (2013.01); *B25J 11/008* (2013.01)

(58) Field of Classification Search
CPC ...... B25J 9/1679; B25J 9/1653; B25J 9/1664; B25J 11/008; G07C 9/00896; G06Q 10/08; G07B 17/00467
See application file for complete search history.

(56) References Cited

U.S. PATENT DOCUMENTS

| | | | |
|---|---|---|---|
| 10,310,500 B1 * | 6/2019 | Brady ..................... B60L 58/12 |
| 10,556,334 B1 * | 2/2020 | Theobald ................... B25J 9/00 |
| 11,099,562 B1 * | 8/2021 | Ebrahimi Afrouzi ....................... G05D 1/0225 |
| 11,231,706 B1 * | 1/2022 | Curlander .............. G05D 1/101 |
| 2019/0250636 A1 * | 8/2019 | Szubbocsev ........... G05D 1/227 |
| 2021/0046650 A1 * | 2/2021 | Deyle .................. G05D 1/0214 |
| 2021/0290796 A1 * | 9/2021 | Gillespie ................... A61L 2/26 |
| 2021/0316945 A1 * | 10/2021 | Lui ......................... B60P 3/007 |
| 2021/0339399 A1 * | 11/2021 | Schluntz .............. G05D 1/0088 |

* cited by examiner

*Primary Examiner* — Dylan M Katz
(74) *Attorney, Agent, or Firm* — Javier Sobrado; The Brickell IP Group, PLLC

(57)                ABSTRACT

A system for receiving and delivering packages to a building having a package receiving station, a delivery robot and a control system. The package receiving station having a display, an input device, a package receiving area, a robot loading area, at least one package manipulation devices, and a computing device, and the delivery robot capable of interacting with the package receiving station to receive packages to be delivered, such that the package receiving station is capable of receiving a package at the package receiving area, moving it to the robot loading area and loading the package onto the delivery robot and the control system is capable of notifying a recipient of the arrival of the package, coordinating a delivery time, and initiating a package delivery whereby the package is loaded onto the delivery robot and delivered to a location within the building and delivers the package.

19 Claims, 13 Drawing Sheets

10 Automated Package Delivery Method

11 Conducting Package Intake

12 Storing the Package

13 Delivering the Package

FIG. 2

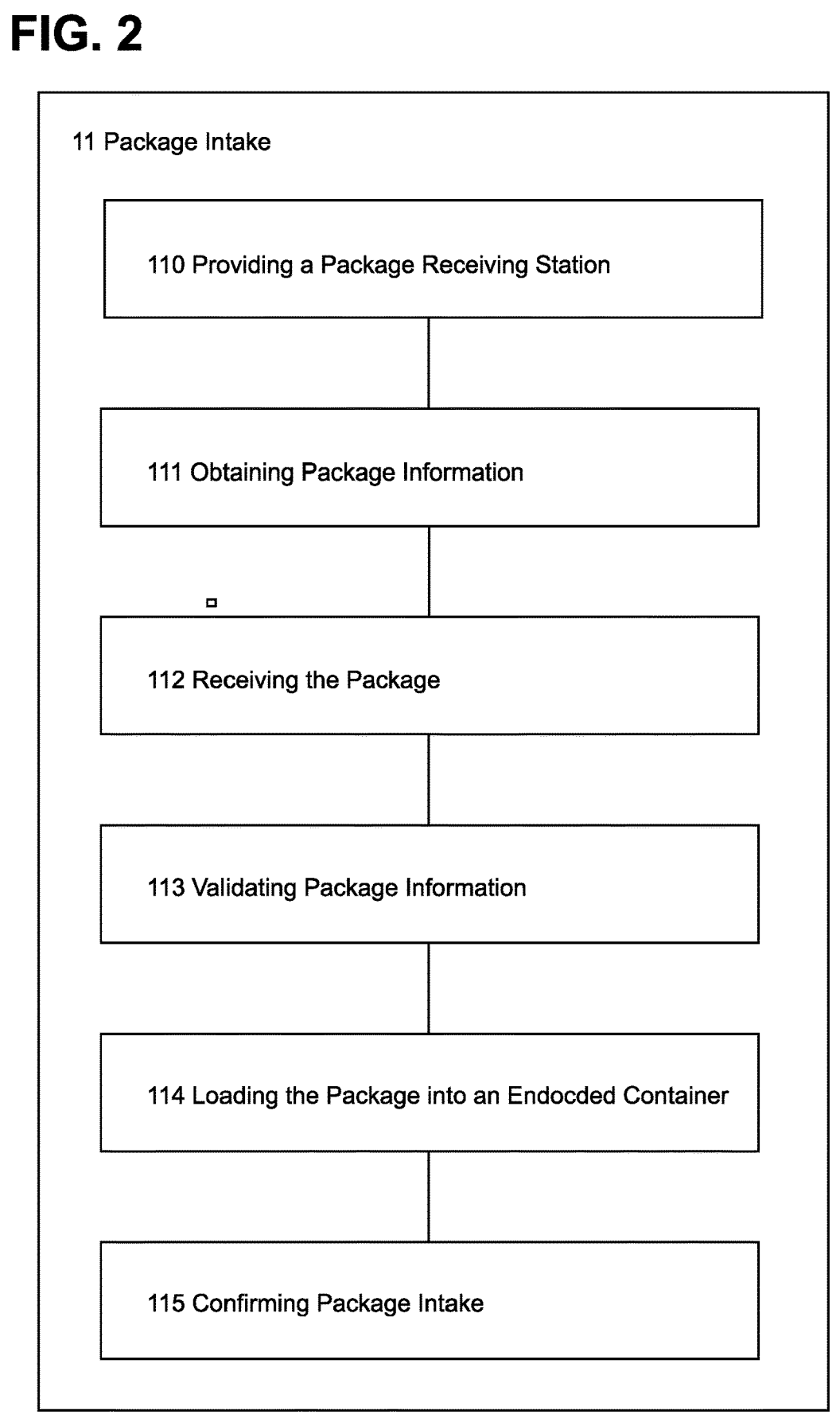

11 Package Intake

110 Providing a Package Receiving Station

111 Obtaining Package Information

112 Receiving the Package

113 Validating Package Information

114 Loading the Package into an Endocded Container

115 Confirming Package Intake

13 Delivering the Package

130 Selecting a Suitable Delivery Robot

131 Loading the Package onto the Delivery Robot

132 Calculating a Delivery Route

133 Navigating the Delivery Route

134 Comm with Elevator Control

135 Updating Route

136 Communicating with Recipient that Delivery is Ready

137 Providing the Recipient Access to the Package

30 Automated Package Conveyance Method

31 Conducting Package Collection

32 Transporting the Package to the Package Station

33 Conveying the Package to a Courier

FIG. 11

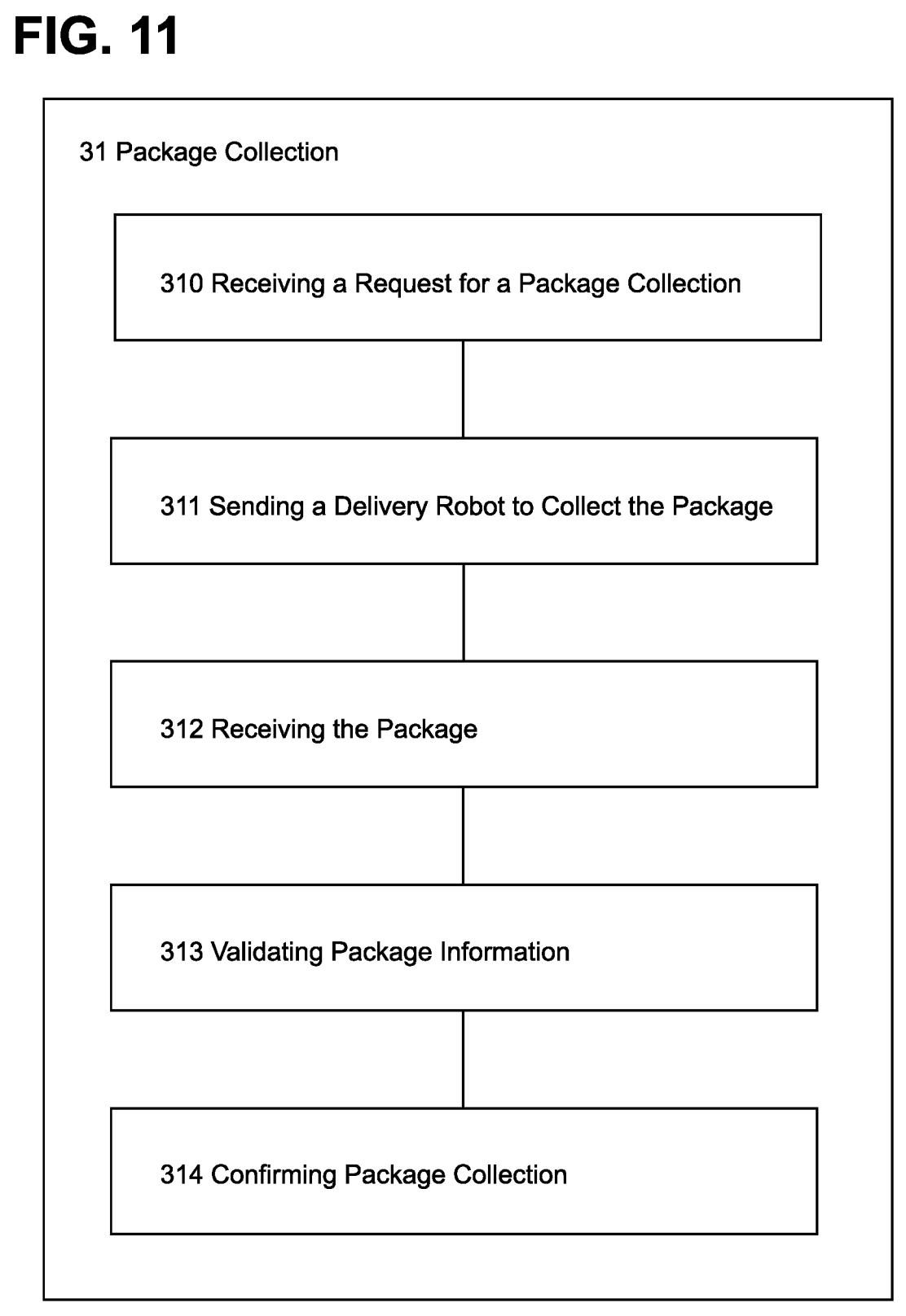

31 Package Collection

310 Receiving a Request for a Package Collection

311 Sending a Delivery Robot to Collect the Package

312 Receiving the Package

313 Validating Package Information

314 Confirming Package Collection

33 Conveying the Package

331 Obtaining the Package from the Delivery Robot

332 Storing the Package

333 Moving the Package to a Conveyance Location

334 Providing Courier Access to the Package

SYSTEM, METHOD AND DEVICE FOR MANAGING AN AUTONOMOUS ROBOT DELIVERY SYSTEM FOR A BUILDING

CROSS-REFERENCE TO RELATED APPLICATIONS

This application claims the benefit of U.S. Provisional Patent Application 63/221,400, filed Jul. 13, 2021, the contents of which are incorporated by reference herein in its entirety.

FIELD OF THE INVENTION

The disclosed concepts relate to the field of robotics, and more specifically to autonomous robot delivery systems for a building.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In certain embodiments, a system for receiving and delivering packages to a building may include a package receiving station, a delivery robot and a control system. The package receiving station may be capable of receiving and storing packages, and may include a display, an input device, a package receiving area, a robot loading area, at least one package manipulation devices, and a computing device. The delivery robot may be capable of interacting with the package receiving station to receive packages to be delivered. The package receiving station may further be capable of receiving a package at the package receiving area, and moving the package to the robot loading area and loading the package onto the delivery robot with the at least one package manipulation devices. The control system is capable of notifying a recipient of the arrival of the package; coordinating a delivery time with the recipient, and initiating a package delivery whereby the package is loaded onto the delivery robot by the package receiving station, and the delivery robot travels to a delivery location within the building and delivers the package.

In an embodiment, a system for receiving, delivering and sending out packages from a building may include a package receiving station, a delivery robot and a control system. The package receiving station may be capable receiving and storing packages, and may include a display, an input device, a package receiving area, a robot loading area, at least one package manipulation devices, and a computing device. A delivery robot may be capable of interacting with the package receiving station to receive packages to be delivered. The package receiving station may be capable of receiving a package at the package receiving area, and moving the package to the robot loading area and loading the package onto the delivery robot with the at least one package manipulation devices. The control system may be capable of notifying a recipient of the arrival of the package, coordinating a delivery time with the recipient, and initiating a package delivery whereby the package is loaded onto the delivery robot by the package receiving station, and the delivery robot travels to a delivery location within the building and delivers the package. The package receiving station may further be capable of receiving an outgoing package at the robot loading area, moving the outgoing package to a package pickup area, which may be the same or different as the package receiving area, and delivering the outgoing package to a courier for delivery to a second recipient. The control system may further be capable of scheduling an outgoing package delivery with a tenant of the building, such that the control system schedules an outgoing package pickup, and routes a delivery robot to the tenant's unit for a package pickup.

In an embodiment, a system for receiving and delivering packages to a building may include a package receiving kiosk capable receiving package information, a delivery robot and a control system. The package receiving station may include a display, an input device, and a computing device. The delivery robot may be capable of receiving packages to be delivered. The package receiving station maybe capable of displaying a request for package information for a first package on the display, and receiving package information via the input device. The control system may be capable routing the delivery robot to receive the first package, coordinating a delivery time with the recipient, and initiating a package delivery whereby the delivery robot travels to a delivery location within the building and delivers the package.

BRIEF DESCRIPTION OF THE DRAWINGS

The drawings set forth exemplary embodiments of the disclosed concepts, and are not intended to be limiting in any way.

FIG. 2 illustrates a flow diagram for a method for package intake.

FIG. 11 illustrates a flow diagram for a method for package collection.

DETAILED DESCRIPTION

Figure 1:
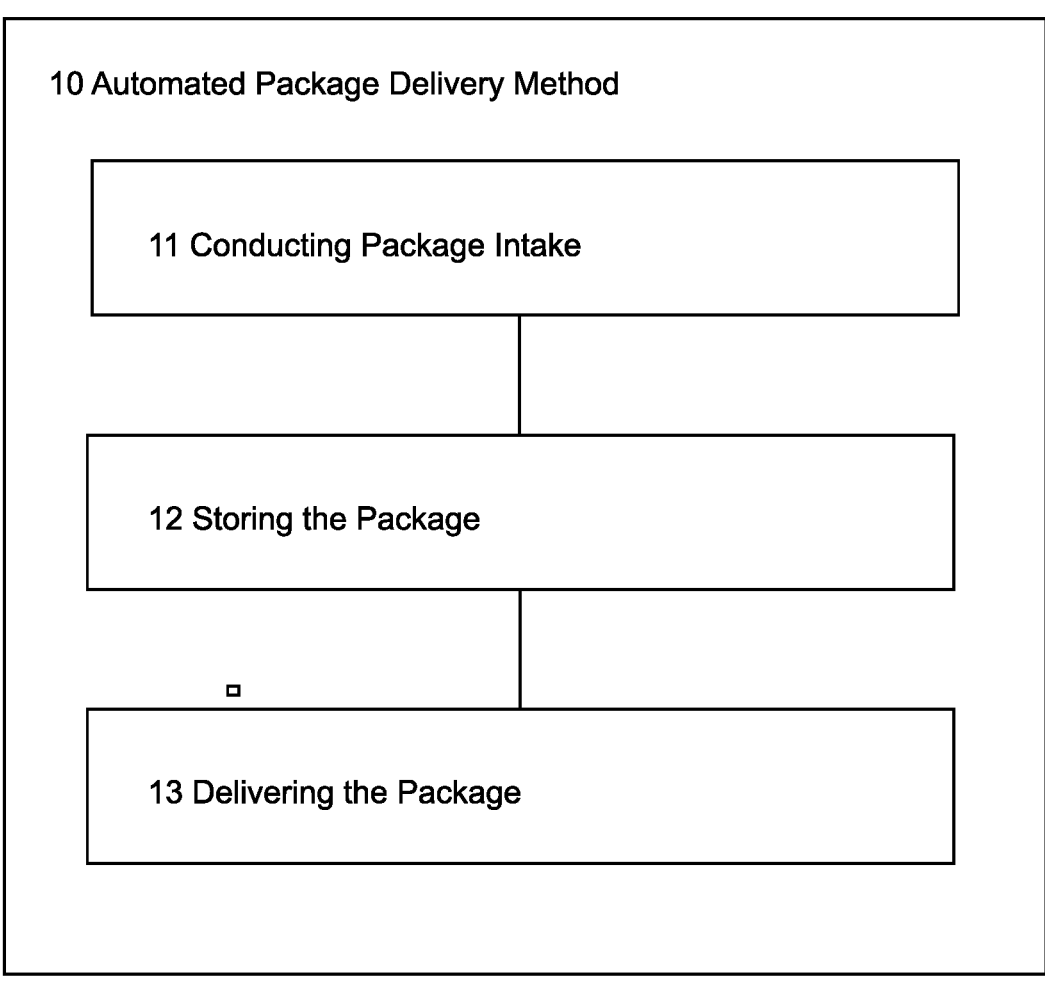
FIG. 1 illustrates a flow diagram for a method for automated package delivery.

The following detailed description and the appended drawings describe and illustrate exemplary embodiments solely for the purpose of enabling one of ordinary skill in the relevant art to make and use the invention. As such, the detailed description and illustration of these embodiments are purely exemplary in nature and are in no way intended to limit the scope of the invention, or its protection, in any manner. It should also be understood that the drawings are not to scale and in certain instances details have been omitted, which are not necessary for an understanding of the present invention, such as conventional details of fabrication and assembly.

In certain embodiments, a system for receiving and delivering packages to a building may include a package receiving station, a delivery robot and a control system. The package receiving station may be capable of receiving and storing packages, and may include a display, an input device, a package receiving area, a robot loading area, at least one package manipulation devices, and a computing device. The delivery robot may be capable of interacting with the package receiving station to receive packages to be delivered. The package receiving station may further be capable of receiving a package at the package receiving area, and moving the package to the robot loading area and loading the package onto the delivery robot with the at least one package manipulation devices. The control system is capable of notifying a recipient of the arrival of the package; coordinating a delivery time with the recipient, and initiating a package delivery whereby the package is loaded onto the delivery robot by the package receiving station, and the delivery robot travels to a delivery location within the building and delivers the package.

In certain embodiments, the control system may be disposed within the computing device of the package receiving station. In certain embodiments, the control system may be separate from the package receiving station and may be capable of communicating with the package receiving station to initiate a package delivery.

In certain embodiments, the package receiving station may perform a package intake that includes obtaining package information and receiving the package. In certain embodiments, the package receiving station may further include a validating area, wherein the package intake further comprises validating the package information. In certain embodiments, the package receiving station may further include a container loading area wherein received packages can be loaded into containers to facilitate delivery. In certain embodiments, the container loading area and the robot loading area may be in separate locations within the package receiving station.

In certain embodiments, the system may further include an encoded container, comprising a storage area, an access door and an identifier. In certain embodiments, the encoded container may further include disinfectant devices. In certain embodiments, the encoded container may further include sensors that may assist in validating package information when the package is undergoing a package intake.

In certain embodiments, the package receiving station may further include a preliminary storage location and a long-term storage location, such that received packages that are recently received are kept in the preliminary storage location, and such that received packages for which delivery has failed or has not been scheduled within a threshold time are stored in long-term storage.

In certain embodiments, the system may further include an elevator control subsystem capable of controlling at least one elevator in the building, in order to enable the delivery robot to travel between floors of the building. In certain embodiments, the system may further include an elevator occupancy subsystem capable of monitoring usage and occupancy information of the at least one elevator. In certain embodiments, the elevator occupancy may communicate the usage and occupancy information to the control system, and the control system may be capable of selecting a first elevator of the at least one elevator for the delivery robot to use.

In certain embodiments, the delivery robot may include a storage compartment having a compartment door capable of receiving a package to be delivered, a display, an input device, sensors; and an on-board computing device. In certain embodiments, the delivery robot may be capable of requesting verification information from the recipient prior to providing the recipient with access to the package, and may receive wherein the verification information from the recipient via the input device on the delivery robot. In certain embodiments, the delivery robot may be capable of autonomous movement and may be capable of calculating and altering its own route to the delivery location.

In certain embodiments, the control system may further be capable of scheduling an outgoing package delivery with a tenant of the building, such that the control system may schedule an outgoing package pickup, and route a delivery robot to the tenant's unit for a package pickup. The package receiving station may further be capable of receiving an outgoing package at the robot loading area; moving the outgoing package to a package pickup area, which may be the same or different as the package receiving area; and delivering the outgoing package to a courier for delivery to a second recipient;

In an embodiment, a system for receiving, delivering and sending out packages from a building may include a package receiving station, a delivery robot and a control system. The package receiving station may be capable receiving and storing packages, and may include a display, an input device, a package receiving area, a robot loading area, at least one package manipulation devices, and a computing device. A delivery robot may be capable of interacting with the package receiving station to receive packages to be delivered. The package receiving station may be capable of receiving a package at the package receiving area, and moving the package to the robot loading area and loading the package onto the delivery robot with the at least one package manipulation devices. The control system may be capable of notifying a recipient of the arrival of the package, coordinating a delivery time with the recipient, and initiating a package delivery whereby the package is loaded onto the delivery robot by the package receiving station, and the delivery robot travels to a delivery location within the building and delivers the package. The package receiving station may further be capable of receiving an outgoing package at the robot loading area, moving the outgoing package to a package pickup area, which may be the same or different as the package receiving area, and delivering the outgoing package to a courier for delivery to a second recipient. The control system may further be capable of scheduling an outgoing package delivery with a tenant of the building, such that the control system schedules an outgoing package pickup, and routes a delivery robot to the tenant's unit for a package pickup.

In an embodiment, a system for receiving and delivering packages to a building may include a package receiving kiosk capable receiving package information, a delivery robot and a control system. The package receiving station may include a display, an input device, and a computing device. The delivery robot may be capable of receiving packages to be delivered. The package receiving station maybe capable of displaying a request for package information for a first package on the display, and receiving package information via the input device. The control system may be capable routing the delivery robot to receive the first package, coordinating a delivery time with the recipient, and initiating a package delivery whereby the delivery robot travels to a delivery location within the building and delivers the package.

FIG. 1 illustrates a flow diagram for a method for automated package delivery. A method for automated package delivery for a building 10 may include conducting package intake 11, storing the package 12, and delivering the package 13.

FIG. 2 illustrates a method for conducting package intake 11. Conducting package intake 11 may include providing a package receiving station where a delivery person may initiate a package intake 110; requesting package information from the delivery person 111; receiving the package 112; validating the package 113; loading the package into an encoded container 114, and confirming package intake 115. Providing a package receiving station 110 may include providing a package receiving station 21 having a display 210, an input 211, and at least one receiving area 212. The display 210 may be any suitable display including a touch screen, monitor, or any other suitable display. The input may be a keyboard, mouse, mouse wheel, touch screen, optical sensor, or any other suitable input. Persons of skill in the art will recognize that in the case of a touch screen, the display 210 and input 211 may be integrated into the same touch screen. The package receiving station 21 may display a start screen on its display 210, instructing a delivery person to "press here to begin" or similar message. The intake procedure may be initiated by the delivery person using the input 211.

Once the intake has been initiated obtaining package information from the delivery person 111 may include displaying a graphical user interface on the display 210 that requests information from the delivery person that may assist with validation and delivery of the package. The delivery person may input the requested information using the information requested may include requesting a unit number within the building, such as an apartment number, company or division name, suite number, or any other suitable identifier showing where the package is to be delivered. The information requested may include the identity of the recipient, which may be matched against a list of authorized recipients for the building, or for a particular unit. The information requested may include special instructions or package characteristics, such as the size and weight of the package, and whether the package is fragile, required environmental controls, or has other special requirements. The information may be requested all at once via the graphical user interface, or it may be provided in cascading fashion based on previous input. For example, when the delivery person selects a building unit, the graphical user interface may display a list of authorized recipients for that unit (such as employees at a company or residents of an apartment) that the delivery person may select from.

Receiving the package 112 may include identifying a suitable receiving area 212 on the package receiving station 21 are based on package size and weight information and/or based on the special instructions or characteristics; opening the selected receiving area 212, and having the delivery person deposit the package in the receiving area. The receiving area 212 may optionally comprise or include an encoded container 22, described in greater detail below. In some embodiments the receiving area 212 may close to enclose the package during validation. In some embodiments, where multiple packages are being delivered to the same building unit, the delivery person may deposit all the packages for that unit together, while in other embodiments packages may have to be deposited one at a time.

Validating the package information 113 may include measuring the weight of the package and the dimensions of the package using a load sensor and laser measuring sensors, and or any other suitable sensor. The sensors may be provided in the receiving area 212 of the package receiving station, in an encoded container 22, or in a separate validating area 213 of the package receiving station. In embodiments with a separate validating area, the package receiving station may transport the package from the package receiving station to the validating area 213 through conveyors, robot arms, or any other suitable means known in the art or to be discovered. Validating the package information 113 may also include using specialized sensors, such as a water sensor to ascertain whether the package is in a suitable condition (i.e. not wet or leaking). In high security buildings validating the package information 113 may also include utilizing x-rays, metal detectors, dangerous chemical detectors, and other such sensors to verify that a package is not a hazardous. In some implementations, the validation step may also include disinfecting the package by spraying it with a disinfectant or exposing it to ultra violet light. Other validation steps known in the art or to be discovered may also be utilized within the scope of the disclosed concepts.

Loading the package into an encoded container 114 may include selecting a suitable encoded container 22 based on validation data or inputted package data, and putting the package in an encoded container 22 having an identifier 225, such as an RFID tag, a QR code, an ID number, or any other suitable identifier. In some embodiments the identifier may be unique. As discussed above, this step may be accomplished as part of receiving the package 112 prior to validating the package 113, in embodiments where an encoded container 22 is provided in the package receiving area 212. Alternatively, the package may be transported from the receiving area 212 or the validating area 213 to a container loading area 214, where the package may be deposited within the encoded container by means of a robot arm, conveyors, or any other suitable means known in the art or to be developed.

Confirming package intake 115 may include logging the package information and delivery circumstances, and displaying a package intake confirmation. The package information, including unit number, recipient, date and time of delivery, size, weight, and other validation information may all be logged and recorded in a database. If an implementation includes cameras, such as a separate camera subsystem 27, or cameras in the package receiving station 21 or delivery robot 23 that take photographs or video of the package intake and/or delivery process for the package, the photographs and video may also be stored in the database with the other package information, or in an alternate storage unit which may be linked to the database.

Figure 3:
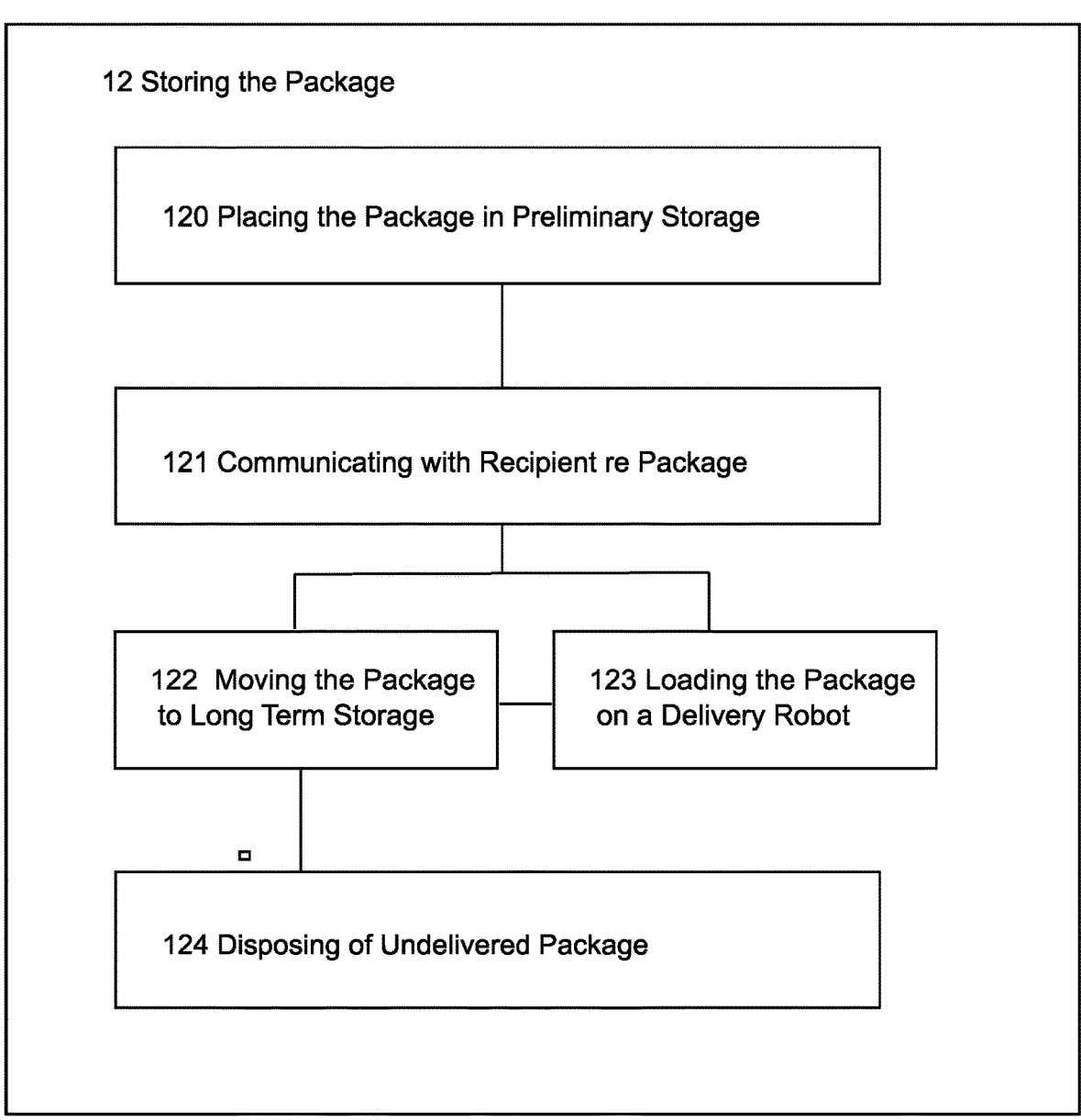
FIG. 3 illustrates a flow diagram for a method for storing a package for delivery.

FIG. 3 illustrates a method for storing the package 12. Storing the package 12 may include placing the package into preliminary storage 120; communicating with the recipient regarding the package 121; moving the package to long-term storage 122; moving the package to the robot loading area 123; and disposing of undelivered packages 124. Placing the package into preliminary storage 120 may include leaving the package in its encoded container 22 in the package receiving area 212, the validating area 213, or in the container loading area 214 in embodiments where each encoded container is kept in its own respective package receiving area 212, validating area 213 or container loading area 214 until delivery or movement to long term storage. In embodiments where the package receiving area 212, validating area 213, or container loading area 214 will be reused for other encoded containers 22, placing the package into preliminary storage may include moving the package from one of those areas 212, 213, 214 to a preliminary storage area 215. The preliminary storage area may be selected based on package information and expected time of delivery (if a system tracks its users delivery preferences).

Communicating with the recipient regarding the package 121 may include notifying the user that the package has arrived by email, text or via a mobile device application that the recipient may access, and requesting that the user schedule delivery or request longer term storage. If the user requests delivery or schedules a delivery within a certain time threshold, the package may remain in its preliminary storage location 215 until delivery time, and then the package may be delivered to a robot loading location 216 as part of loading the package onto a delivery robot 123. This step may also include reserving a delivery robot for the requested delivery time. Alternatively, if the user selects to store the package for a period of time exceeding a certain threshold, the package may be moved from its preliminary storage location 215 to a long-term storage location 217 as part of moving the package to long term storage 122.

Moving the package to long term storage 122, as discussed above, may be initiated when a user selects to keep the package in the package receiving station beyond a certain threshold (such as an hour, or a day, or any desired time period), or when a delivery fails and the delivery robot 23 returns the package to the package receiving station 21. While the package is in in its long term storage location 217, the system may keep communicating with the user regarding the package 122 to remind the user periodically or at preset intervals that the package is at the package receiving station 21. The communication efforts may decrease in implementations that have a maximum storage time, and may warn the user that the package will be disposed of or destroyed if it is not delivered before the maximum storage time.

Moving the package to the robot loading area 123 may include transporting the package from its current location 212, 213, 213, 214, 215, 217, to a robot loading area 216 of the package receiving station 21 where it can be loaded on to the delivery robot 23. The transportation between areas and loading of the encoded container 22 onto the delivery robot 23 may be handled by robot arms, conveyor belts, or any other suitable means known in the art or to be developed. In some implementation, moving the package to the robot loading area may include identifying a delivery robot with sufficient charge and storage capacity to receive and deliver the package, receiving the delivery robot 23 in the robot delivery area, prior to or at the same time that the package is being transported to the robot loading area. To determine whether a delivery robot has sufficient charge to deliver a package, the charge required for the delivery robot to deliver the package may be calculated by the system based on the distance to the unit within the building, the weight of the package and its encoded container, building asset usage information (such as the expected wait for the arrival and travel on an elevator), the distance to the nearest charging station after delivery, and a safety margin factor.

At each event within storing the package 12, the package status may be logged and stored in the database, including but not limited to where the package is currently located within the package receiving station 21, all communication efforts with the recipient and their responses, and any scheduled delivery time.

Disposing of undelivered packages 124 is an optional step for implementations that have a maximum storage time. This may include removing the package from its encoded container 22, and transporting it to a disposal area(not shown), or coordinating with a delivery robot 23 to deliver the package to a detached disposal area.

Figure 4:
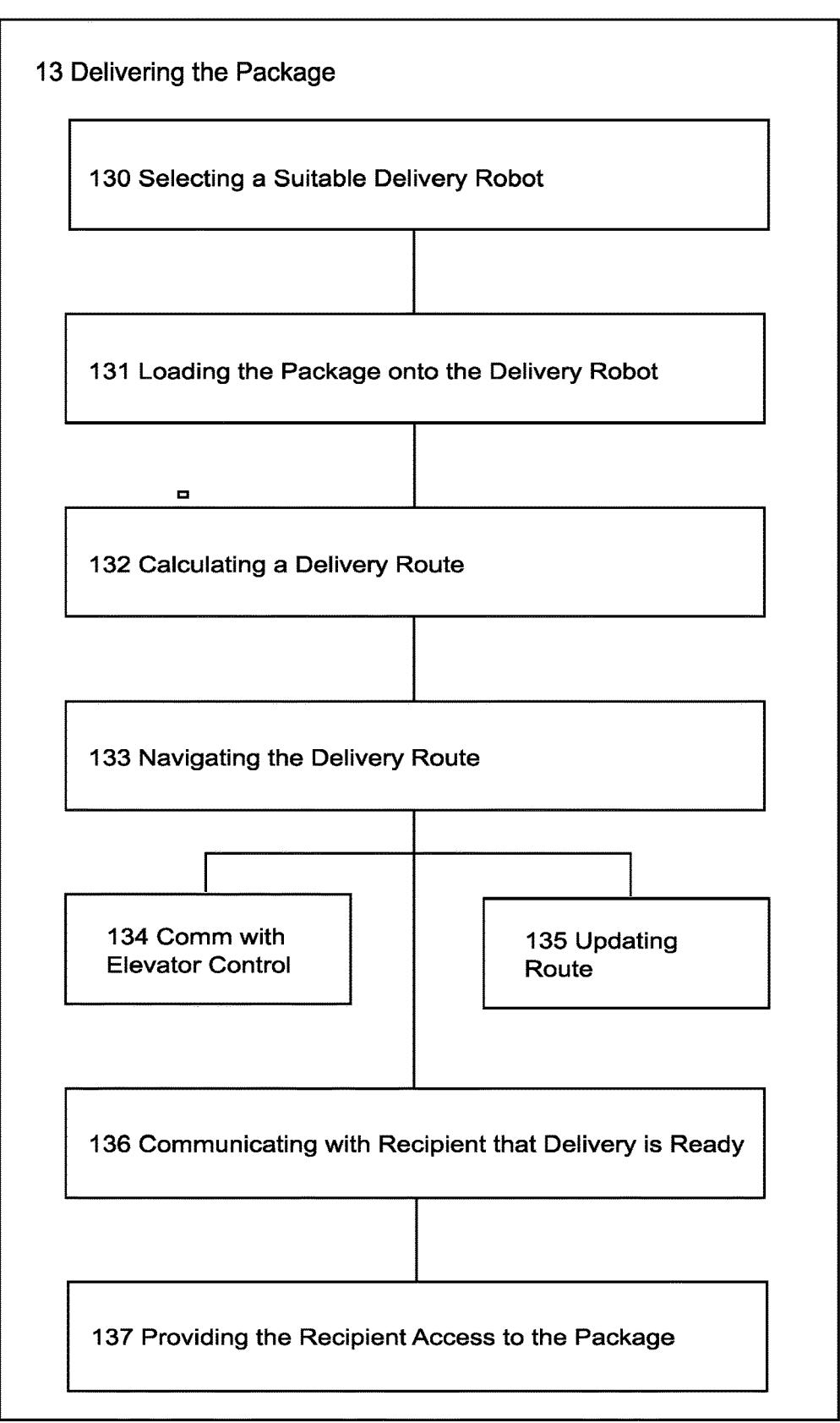
FIG. 4 illustrates a flow diagram for a method for delivering a package.

FIG. 4 illustrates a method for delivering the package. Delivering the package 13 may include identification of a suitable robot for delivery 130; loading the package onto the delivery robot 131, calculating a suitable route to the delivery location 132; navigating to the delivery location 133; communicating with the elevator control system 134; updating the delivery route 135; communicating with the recipient when delivery is ready 136; and providing the recipient access to the package 137. Identification of a suitable robot for delivery 130 may have been handled as part of moving the package to the robot loading area 123, or may be performed separately as part of the delivery process. As discussed above, the robot selected should have sufficient charge to deliver the package and to make it to a either a charging station or the package receiving station with a safety margin.

Loading the package onto the delivery robot 131 may include having the selected robot enter the robot delivery station, opening the storage compartment 230 on the robot, and placing the encoded container 22 within the storage compartment 230 of the delivery robot 23. This maybe accomplished with a robot arm, conveyors, or any other suitable means known in the art or to be developed. When the encoded container 22 is loaded onto the robot, the package status may be updated and logged in the database as ready for delivery.

Calculating a suitable route to the delivery location 132 may include evaluating the amount of traffic at elevator banks in the building, and the expected availability of elevators in those elevator banks in order to minimize delivery time. Calculating a suitable route to the delivery location may be performed by a robot control subsystem 24 or may be performed by a processor on the delivery robot 23. As part of calculating a suitable route to the delivery location, the delivery robot 23 and/or the robot control subsystem 24 may communicate with an elevator control subsystem 25 to request information about elevator usage and destinations; or request identification of an elevator for the delivery robot to take. In the former implementations, the delivery robot 23 or the robot control subsystem 24 calculate a suitable elevator responsive to the information provided from the elevator control subsystem 25. In the latter implementations, the elevator control subsystem 25 selects the elevator for the delivery robot 23 to take and the delivery robot 23 and/or robot control subsystem incorporates same into the selected route.

Navigating to the delivery location may include the robot following or attempting to follow the selected route, by navigating to the appropriate elevator bank, boarding the selected elevator, travelling to the delivery floor, and traveling to the recipient's building unit. The elevator control subsystem 25 may control the selected elevator so that it opens to allow the delivery robot 23 to board the elevator, so that it travels to the delivery floor, and so that the doors open to allow the delivery robot 23 to exit the elevator, as the robot is navigating to the delivery location. In implementations with cameras, cameras may be provided within the elevator, and may provide images that through image processing can be used to identify an empty portion of the elevator where the robot may stand. In such systems this image processing may be used through the delivery process such that elevator control subsystem 25 and/or a separate elevator occupancy subsystem 26 may have knowledge and may provide such information to the delivery robot 23 or robot control subsystem 24, or select may itself which elevator the delivery robot 23 should use based on the occupancy and available space in the elevators. During this process, if the delivery robot 23 is unable to accomplish part of their route, the delivery robot 23 or robot control system may engage in communicating with the elevator control system 134 or update the delivery route 135 to overcome the problem. For example, if an unexpected backlog of traffic appears at an elevator bank, a new route or new elevator may be selected by the delivery robot 23, the robot control subsystem 24, and/or the elevator control subsystem 25. If human, or other, interference prevents the robot from accomplishing the delivery the delivery robot 23 or the robot control subsystem 24 may notify the building's security personnel to seek assistance in resolving the obstruction. If at any point during the delivery, the delivery robot 23 or the robot control system 24 determines that the delivery is no longer possible—whether because the delivery window has passed, or because the delivery robot does not have enough power to complete the delivery, the delivery may be aborted and rescheduled, and the robot may return the package to the package receiving station (before or after recharging, depending on its power status).

Throughout the process of navigating to the delivery location 133, the delivery robot 23 and/or the robot control subsystem 24 may be provided with a representation of a map of the building, and may track the delivery robot's progress through check points (lobby, elevator, floor lobby, security doors, etc.) while on the delivery route. In implementations that include a mobile or computer specialized application, the recipient may be provided with a visual map of the building that is updated with the delivery robot's 23 progress through these checkpoints and/or the robot's current location within the building.

Communicating with elevator control 134 may include communicating facts regarding a missed elevator or traffic at the assigned elevator, and receiving either a new target elevator to board, or information about elevator usage that can be used by the delivery robot 23 or the robot control subsystem 24 to calculate a new route and/or elevator to use.

Updating the delivery route 135 may include making modifications to the selected delivery route based on elevator usage, or obstructions that are present on the selected delivery route.

Communicating with the recipient when delivery is ready 136 may include sending a notification to the user, by email, text message or through a specialized mobile device or computer application when the delivery robot 23 has arrived at the unit or in the moments just before the delivery robot arrives. In some implementations the delivery robot may be provided with a knocking device to knock on the door, or ring a doorbell, or may wirelessly communicate with the unit's doorbell to orchestrate a ring.

Providing the recipient access to the package 137 may include opening the storage compartment to provide the recipient access to the encoded container 22 and/or the package. In some implementations the robot may be provided with a display 231 and input device 232 allowing the user to enter a passcode to confirm his identification before the storage compartment 230 opens. In implementations with a specialized mobile or computer application, the recipient's mobile device may communicate directly with the delivery robot and/or the encoded container to enable opening of one or both. Such communications may be handled through Bluetooth Low Energy (BLE) technology, or any other suitable communications method. In some implementations the delivery robot 23 or robot control system 24 may communicate with the encoded container 22 to confirm when the package has been removed from same. In other implementations the delivery robot 23 may deliver the package without the encoded container 22, and may have its own load sensor to detect the removal of the package by the recipient. Once the delivery is complete the delivery robot may close its storage compartment 230, or ask the recipient to close the storage compartment, and return to the nearest charging station, or to the package receiving station 21 to make another delivery.

Again, at each step along the way the package's status may be updated as delivery in progress, delivery delayed, delivery complete, or delivery failed, or any other suitable status.

Figure 5:
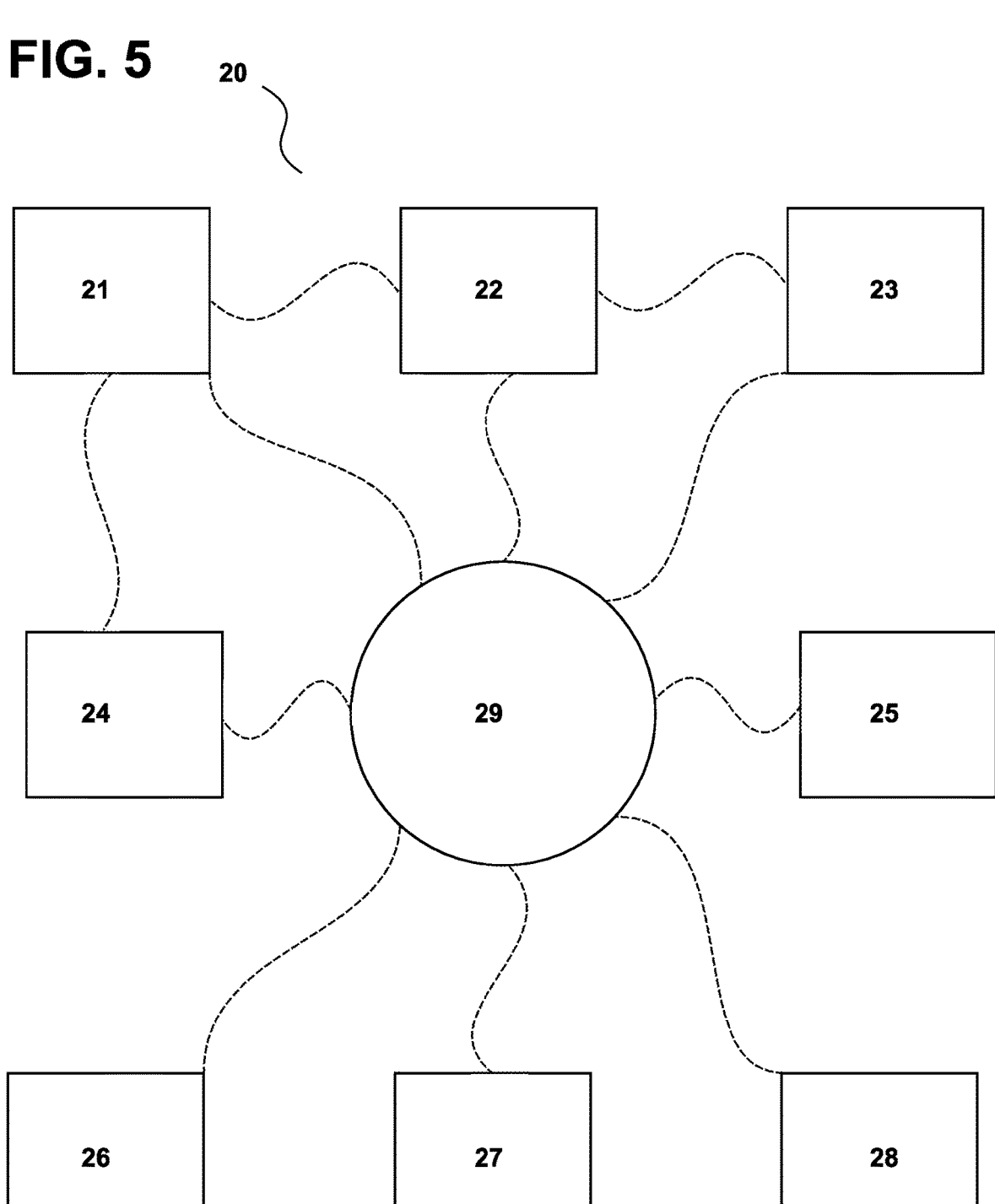
FIG. 5 illustrates a system diagram for a system for automated package delivery.

FIG. 5 illustrates a system for the automated delivery of packages 20 that may include a package receiving station 21, an encoded container 22, a delivery robot 23, a robot control subsystem 24; and an elevator control subsystem 25, an elevator occupancy subsystem 26 a camera subsystem 27, one or more recipient devices 28 (also called user devices), and a wireless communication subsystem 29. The package receiving station 21 may coordinate and control the intake of packages from the outside, and the delivery of packages within the building, as described above. It may communicate wirelessly with other parts of the system 20 through the wireless communication subsystem 29, or directly with other components, such as the encoded container, 22, the delivery robot 23 and the robot control subsystem 24, and the other subsystems) through wired or wireless protocols. It may be integrated with, and physically contain other subsystems, including robot control 24, elevator control 25, elevator occupancy 26, and camera 27.

The encoded container 22 receives a package, may participate in validating the package, and may communicate directly with other parts of the system, such as the package receiving station 21, the delivery robot 23, and a user device 28 through Bluetooth or other suitable protocols. As described above, it may contain sensors to assist in validation of a received package.

The delivery robot 23 handles package delivery within the building, and at times may communicate directly with the package delivery station 21, the encoded container 22, robot control 24, or the user devices 28. It may be an autonomous delivery robot, that calculates its route to deliver the device and communicates with the other subsystems, such as robot control 24, elevator control 25, or elevator occupancy 26 to let them track it progress and/or to obtain information that may affect the delivery route. In some implementations the robot 23 may be equipped with an arm or other device that can push an elevator button. In some implementations the delivery robot 23 may wirelessly communicate with an elevator to select a floor.

The robot control subsystem 24 may coordinate the delivery of packages by delivery robots 23. It may include functionality to allow it to cancel a delivery, shut off an errant delivery robot, and communicate recipients or with human security. It may also communicate with or be with other subsystems in order to obtain information relevant to calculating a delivery route, to override a delivery robot's 23 chosen delivery route, or to detect and report anomalies in the workings of the delivery system 20. It may also be integrated with other subsystems, including the package receiving station 21, elevator control, 25, elevator occupancy 26, and camera 27.

The elevator control subsystem 25 may be a commercially available third-party elevator control system or may specially implemented in accordance with the disclosed concepts. It may control the elevators, such that it can open and close doors to allow delivery robots 23 on and off the elevators, and control what level an elevator goes to, so that the robots do not have to be equipped with devices that can push a button. It may be integrated with elevator occupancy 26 and/or other subsystems.

The elevator occupancy subsystem 26 may detect the amount of passengers in an elevator, or waiting at an elevator bank, and may use such information to determine which elevator a delivery robot 23 should take, or communicate such information to the subsystem 24, 25 or delivery robot 23 that is making that determination. It may be provided with cameras, or communicate with a camera subsystem to obtain a visual image feed of the elevator and/or elevator lobby, and process those images to detect occupancy and backlog. It may further identify open areas within a selected elevator where a delivery robot 23 may stand and communicate that to the delivery robot 23 or other subsystem 24, 25.

The camera subsystem 27 may be a separate subsystem controlling the cameras within the building to document the receipt, validation and delivery of a package, and the images used by elevator occupancy 26, elevator control 25, robot control 24 and/or the delivery robot 23 to select which elevator to take and where the delivery robot 23 should stand within the elevator. Alternatively, each subsystem may have and control any cameras they require to accomplish these tasks without a separate camera subsystem 27.

Recipient/User devices 28 may be mobile devices, smart phones, computers, laptops, tablets, or any other suitable computing device that can run an app that will allow the user device 28 to communicate with the system 20, as described above.

The wireless communication subsystem may be utilize the Internet, may utilize a VPN, or be a LAN, WAN, a series of beacons distributed through a building, or may be any other suitable system capable of communicating and enabling communication between the subsystems 21. 24, 25, 26, and 27, and other components 22, 23,28 of the package delivery system.

Figure 6:
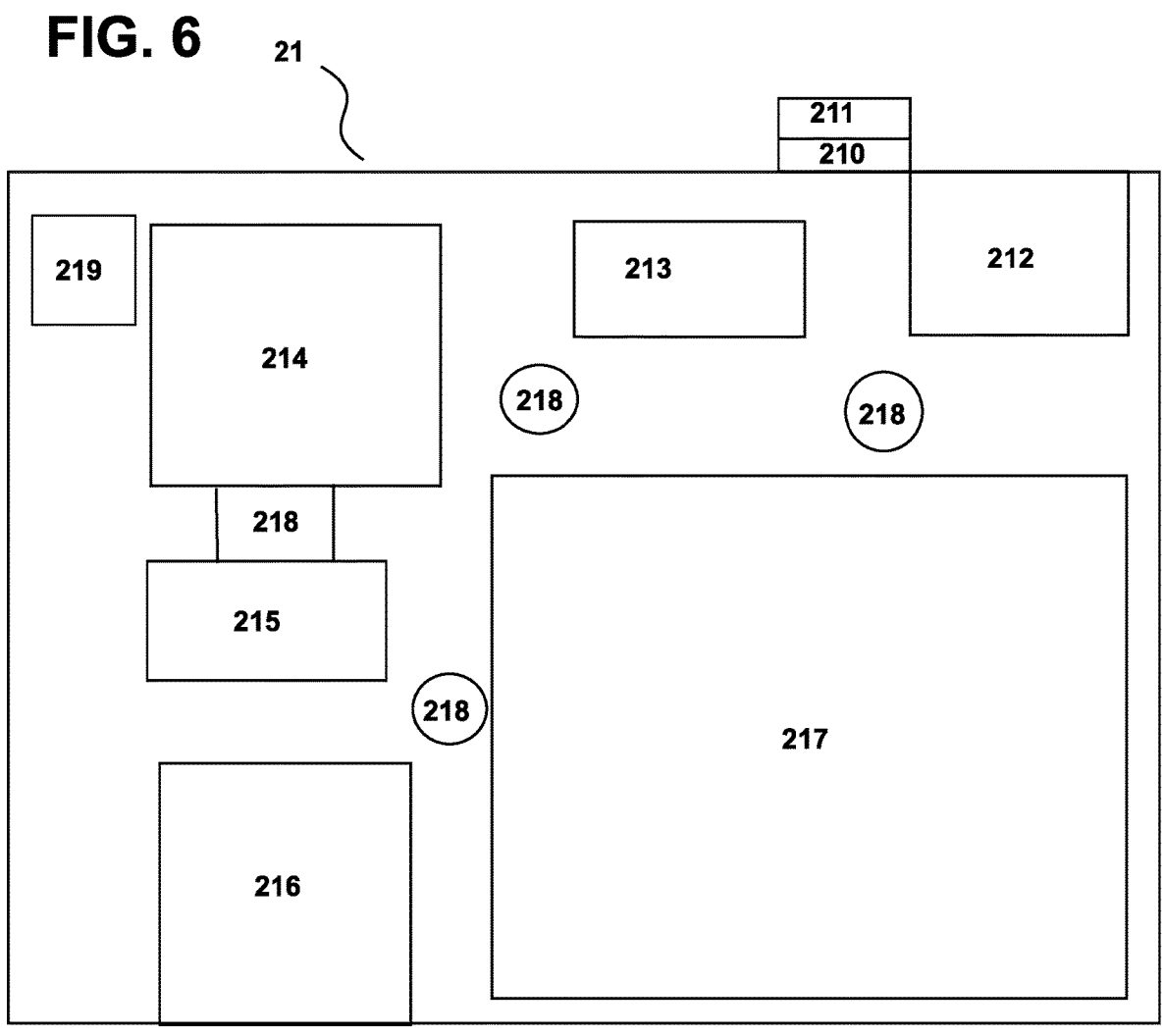
FIG. 6 illustrates a system diagram of a package receiving station.

FIG. 6 illustrates a system diagram of a package receiving station 21. A package receiving station 21 may include a display 210, an input 211, a package receiving area 212, a validating area 213, a container loading area 214, a preliminary storage location 215, a robot loading area 216, a long-term storage area 217, one or more package manipulation devices 218, and a computing device with a transceiver 219. The display may be a monitor, lcd screen, touch screen, or any other suitable display known in the art or to be developed. The input 211 may be a keyboard, keypad, mouse, touch screen, or any other suitable input known in the art or to be developed. In some implementations the same touch screen may serve as input 211 and display 210. The receiving area 212 may comprise one or more areas capable of receiving a package or packages of various sizes. The receiving area 212 may have sensors to assist with validation, as described above. The receiving 212 area may also be provided with a disinfectant spray or ultra violet lights to disinfect the package. The receiving area 212 may also be able to hold an encoded container 22 within same to receive a package directly. A validating area 213 is optional, and may include sensors to assist with validation and/or disinfecting the package, as described above. A container loading area 214 is optional, and may facilitate loading of a package from the receiving area 212 or validation area 213 into an encoded container 22. A preliminary storage area 215 is optional, and may be used to store a package temporarily until a delivery is scheduled or it is moved into long-term storage 217. A robot loading area 216 may be used to receive delivery robots 23 and to load the delivery robots with the package or with the encoded container 22 containing the package. A long-term storage area 217 is optional and may be used to store packages that are not scheduled for delivery soon after receipt. One or more package manipulation devices 218, such as conveyor belts and/or robot arms may be used to move the packages and/or the encoded containers 22 from one location to another within the package receiving station 21. The computing device with a transmitter 219 may allow the package receiving station 21 to communicate with the encoded container 22, the delivery robot 23, and robot control 24 through the wireless communication system 29. The computing device with a transmitter 219 may also be provided with a processor, memory, and with instructions stored on a non-transitory medium that when executed by the processor cause the package receiving station to perform the method for conducting package intake 11 described above. As discussed above, the package receiving substation 21 may physically house the processors, memory, and non-transitory storage media that is used to run one or more of the other subsystems 24, 25, 26, 27. The processors, memory and non-transitory storage media for those subsystems may be separate or may be shared—that is the same hard drive, memory and processor(s) may run all of the subsystems from within the package receiving station. In some embodiments, the computing device with a transmitter 219 may be located outside of the package receiving station 21, and may externally control same.

Figure 7:
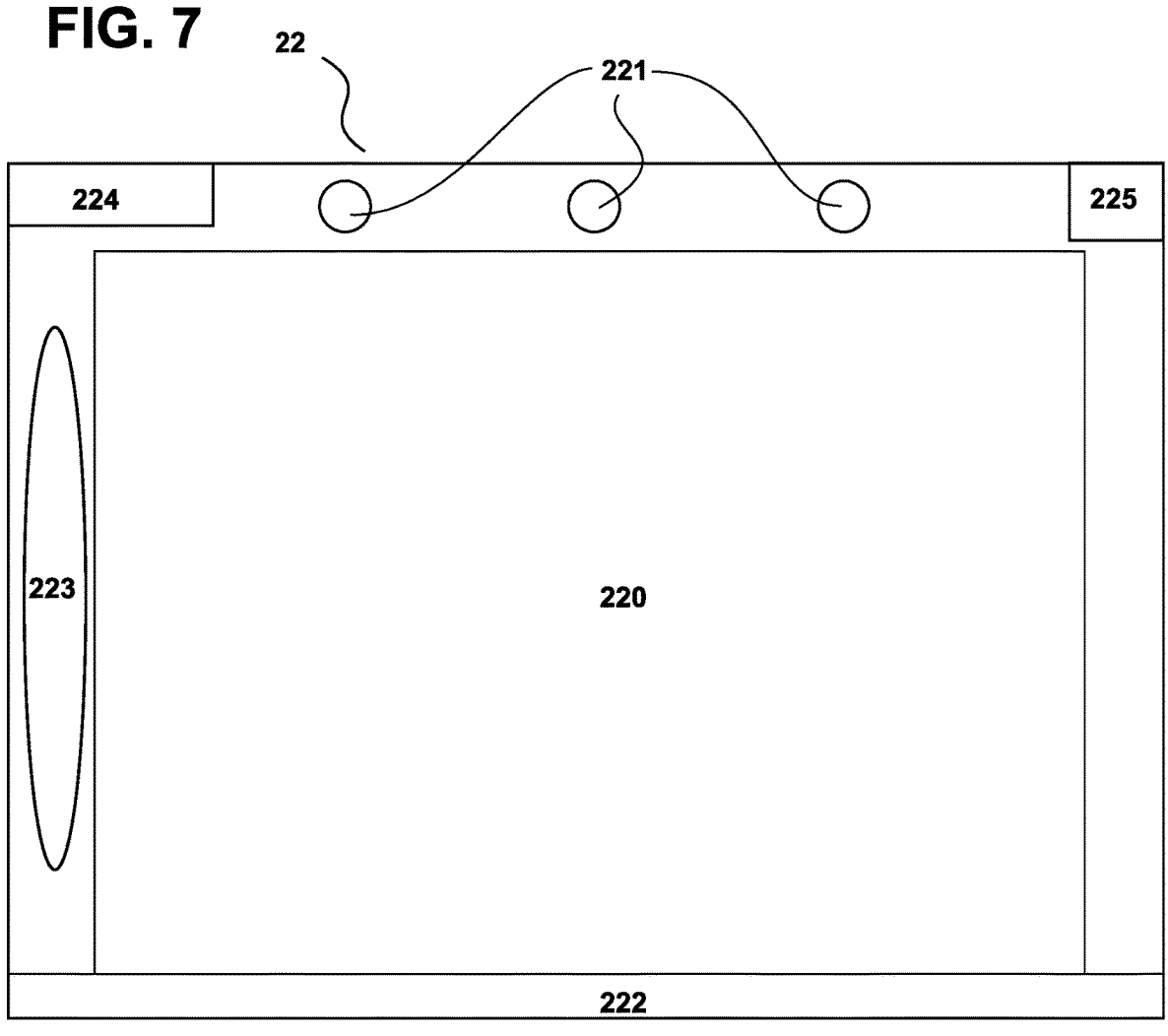
FIG. 7 illustrates a system diagram of an encoded container.

FIG. 7 illustrates an encoded container 22, which may have a package storage area 220 and one or more sensors 221 to assist in validation, as described above, or to help detect and maintain the environment within the storage area. The sensors may include laser sensors, temperature sensors, water sensors, object/load sensors, inertial measurement sensors, and any other suitable sensor known in the art or to be developed. The encoded container 22 may further include an access door 222 to secure the package within the storage area 220 and to allow a recipient to access the package. The encoded container may further have a transmitter allowing it to communicate with the package receiving station 21, the delivery robot 22, and/or a recipient's mobile device 28. The encoded container 22 may disinfectant devices 223, such as UV lights or a disinfectant spray to disinfect the packages once the package is secured within the encoded container 22. The encoded container may further include a computing device 224 with a processor, memory, non-transitory medium, and a transceiver to control the sensors 221, disinfectant devices 223 and/or the access door 222, and to communicate with other subsystems 21, or components 23, 28 of the delivery system 20. The non-transitory medium may store instructions that when executed by the processor enable the encoded container to take sensor 221 measurements and report same, lock or unlock the access door 222, turn on and off the disinfectant devices 223, and to communicate with the package delivery station 21, delivery robot 23, or user device 28. The encoded container may also be provided with an identifier 225, such as an RFID, a QR Tag, bar code, id number, or other suitable identifier.

Figure 8:
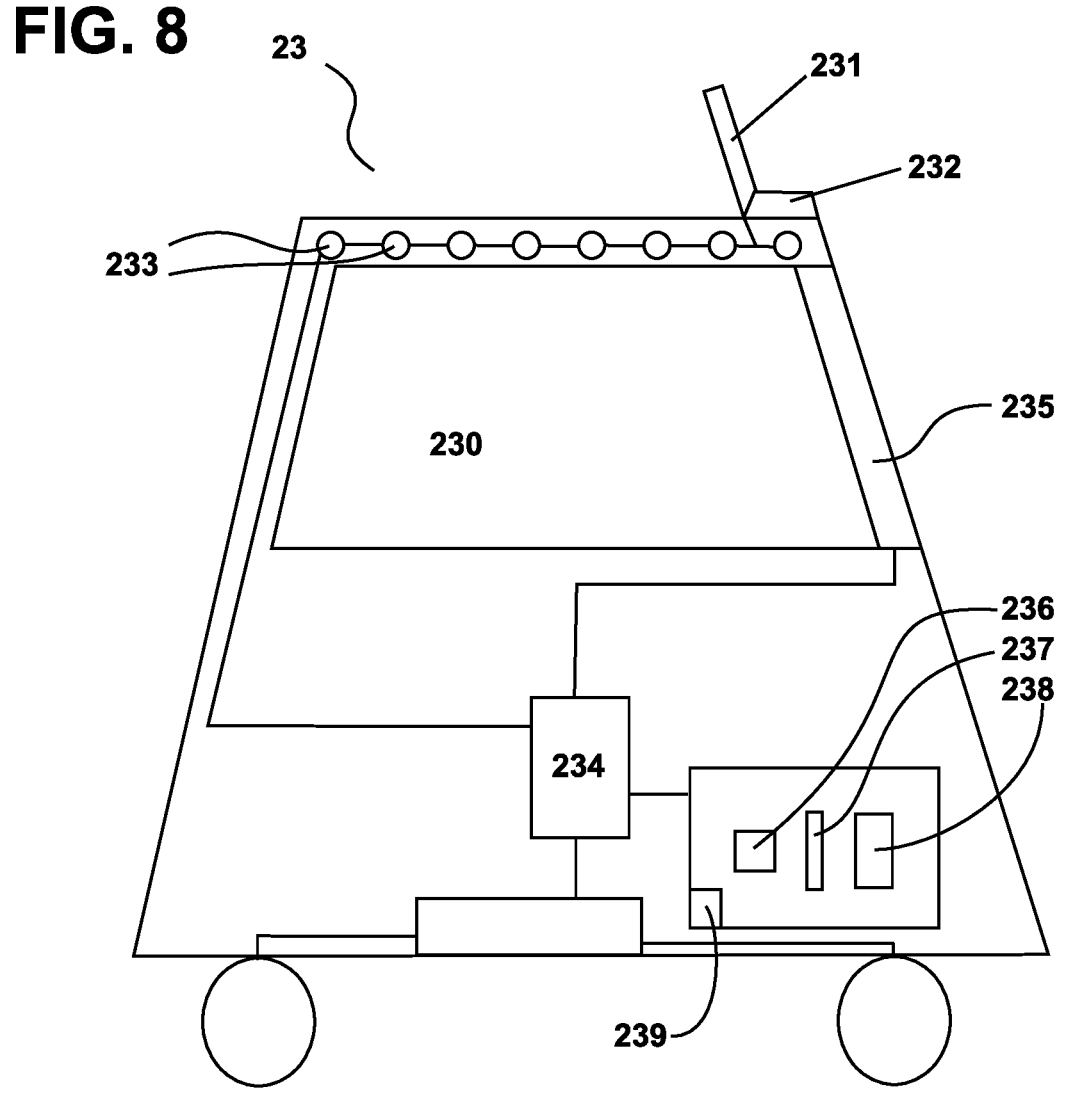
FIG. 8 illustrates a system diagram of a delivery robot.

FIG. 8 illustrates a system diagram of a delivery robot 23. The delivery robot may have a storage compartment 230, a display 231, an input device 232, sensors 233, a battery 234, a compartment door, 235, and an on-board computing device comprising a processor 236, memory 237, transceiver 239 and a non-transitory storage medium 238 containing instructions that when run by the processor allow the robot to control its movement. The display 231 and input device(s) 232 may be any of the displays and input devices described above, including a touch screen that serves as both a display and input device. The sensors 233 may be lidar, 2D or 3D cameras, infrared sensors, ultrasonic sensors, or any other suitable sensors known in the art or to be developed. The delivery robot 23 may also include internal sensors to validate or disinfect the package, as described above. The delivery robot may include motors and a locomotion device (such as wheels, tracks or legs). As discussed above, the non-transitory medium 238 may also store instructions that when executed by the processor cause the delivery robot to (a) identify and report obstacles or problems on the delivery route preventing or delaying delivery (b) calculating or updating the route to the delivery destination unit to take based on information provided by the robot control subsystem 24, the elevator control subsystem 25, and/or the video subsystem 27. Persons of skill in the art will note that the description of the robot's on-board computing device, provided herein is exemplary and may be used for any of the computing devices discussed herein. The delivery robot may also provided with wheels, tracks, motors, and/or other equipment for movement which may also be connected to the battery.

Figure 9:
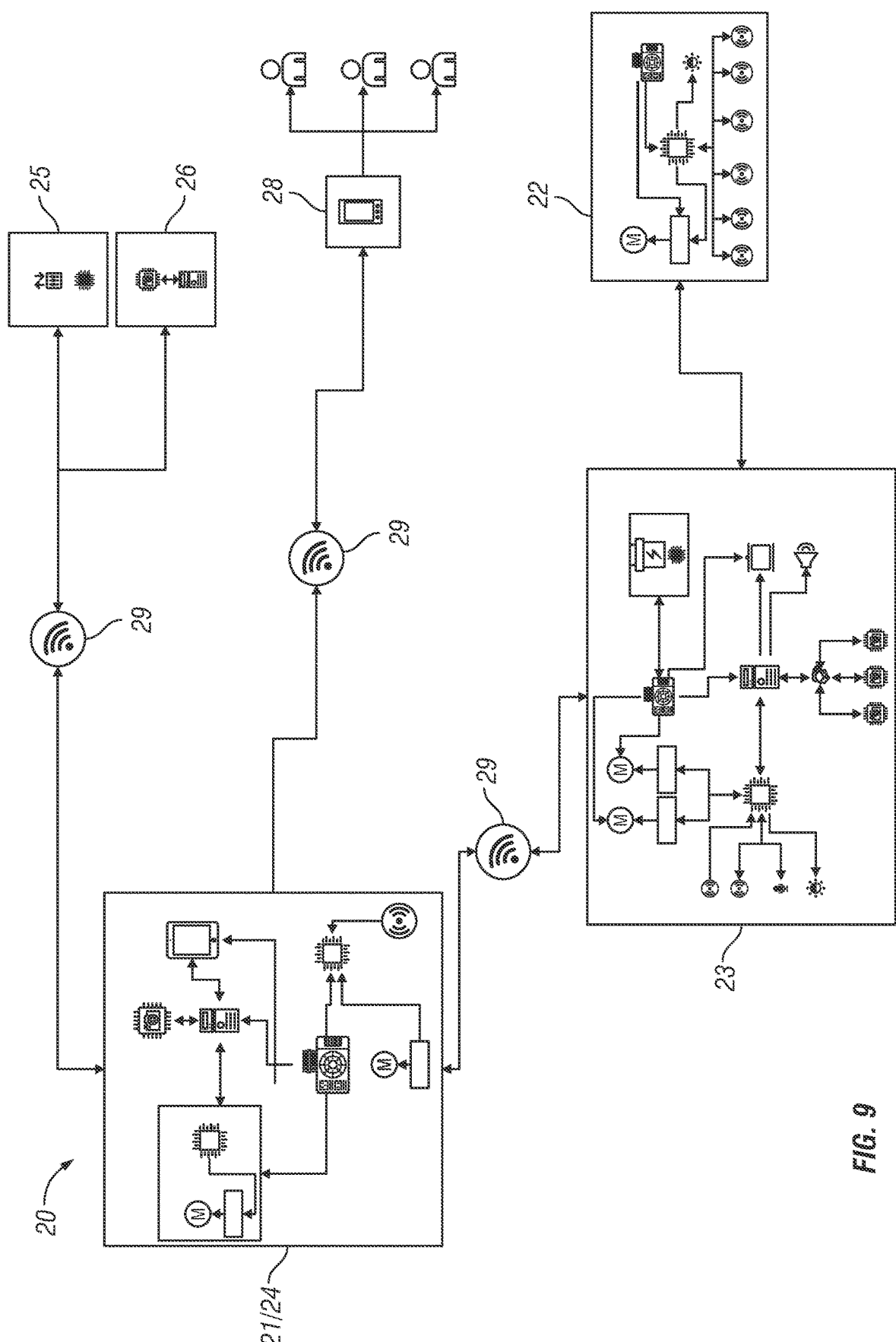
FIG. 9 illustrates a system diagram of an exemplary embodiment of a system for automated package delivery.

FIG. 9 illustrates an exemplary embodiment of an automated package delivery system 20. The system may include a Smart Station™ package receiving station 21, one or more Smart Box™ encoded containers 22, one or more delivery robots 23; a Smart Hub™ robot control system 24 (located within and integrated with the package receiving station 21), an elevator control subsystem 25, an elevator control occupancy subsystem 26, one or more user devices 28, and a wireless communication system 29.

The package receiving station subsystem may include a package receiving station 21 that may receive packages from a package delivery person. The package receiving station may include a package receiving area 212, and a processor, memory and a non-transitory storage medium storing instructions that when executed by the processor cause the package receiving station 21 to perform as described.

The package station subsystem may cause the display to present a graphical user interface to a delivery person that is interfacing with the package receiving station 21. The graphical user interface may be configured to request and receive information regarding packages being received by the package receiving station from a delivery person. The package station subsystem may request and receive input from the delivery person regarding the apartment or unit number, or other identifier, for the package being received. Going forward this application will use apartment number as an example, but persons of skill in the art will recognize that the package delivery system may be configured to deliver to apartments, units, business (as in an office building) building information (where different buildings are connected and managed by the same package delivering system); or any other suitable identifier which tells the system which unit within the system's jurisdiction is to receive the package. The graphical user interface may verify that apartment number or identifier is correct and may further request and receive from the delivery person an identification of the recipient of the package, for example, by presenting a list of residents of the apartment or authorized recipients in a unit. The graphical user interface may also receive other information about the package from the delivery person, including but not limited to the number of packages (if multiple packages are going to the same destination), size or weight of the package(s) being received, and any special instructions applicable to the package(s) being received (such as whether it is fragile, requires environmental controls, etc.).

The package station subsystem may then receive and validate the package, by providing the delivery person access to a storage location where the package will be received. The package station subsystem may open the door to a storage location, unlock a door to a storage location and provide the identity of the appropriate storage location to the delivery person via the display, or may receive the package on a conveyor belt or other such device and then internally transfer the package to a storage location. The package station subsystem may further control validation and/or confirm information about the package including, but not limited to the weight of the package, the size of the package, verifying that the package is not leaking water or another liquid substance. To facilitate validation, the package receiving station may include a load sensor, laser sensors to measure the size of the package, a water or liquid sensor. For high-security buildings, validation may also include utilizing x-rays, metal detectors, dangerous chemical detectors, and other such sensors to verify that a package is not a hazardous. Other validation steps known in the art or to be discovered may also be utilized within the scope of the disclosed concepts.

In some embodiments the package receiving station may provide the delivery person with access to a smart, encoded container, which may handle some or all of the validation steps discussed above, and which may be provided with some, or all, of the sensors discussed above. In such embodiments the encoded container subsystem may receive the measurements taken by the sensors in the encoded container and transmit them to the package station subsystem for evaluation and final validation. Alternatively, the package station subsystem may convey the package information to the encoded container subsystem which can then manage the validation and communicate the result of the validation to the package station subsystem. Persons of skill in the art will appreciate that the division of labor for the validation of a package may be implemented in any suitable manner between the package station subsystem and the encoded container subsystem within the scope of the disclosed concepts.

In other embodiments the package may be put into an encoded container by the package station after validation is complete. In such embodiments the package may be transported from the package receiving area of the package receiving station to a container loading area where the package can be placed in an encoded container. The package station subsystem may select a suitable encoded container based on one or more of the validated size, weight and special instructions. Both the package and the selected encoded container may be transported to the container loading area where the package can then be loaded into the selected container. The loading of the encoded container be accomplished through the use of a robot arm(s), a conveyor system, or through any other means known in the art or to be developed.

Once validation is complete and the package has been placed in an encoded container, the package station subsystem may display the identifier 225 of the encoded container to the delivery person, and may log the circumstances of its receipt of the package, and record the log in a database. The log may include the date and time of the delivery, the apartment number or other unit number, the name of the recipient, the size and/or weight of the package, and the identifier 225 of the encoded container in which the package was received and stored. The package station subsystem may further display a completion screen or otherwise provide the delivery person with a delivery receipt confirmation number or other record as proof of delivery.

The package delivery station may be provided with one or more cameras to record the package intake, and keep a visual record of the procedure in case disputes as to the circumstances of a delivery become disputed. Such cameras may take still images of the package in the condition in which it is received. Such cameras may also record a video of the entire delivery process. In some embodiments there may be a separate camera subsystem 27 that creates and maintains such records.

Once the package intake has been completed, the package station subsystem may initiate a notification to the package recipient that the package has arrived and invite the recipient to coordinate an internal delivery. The notification to the user may be by email, text message, via a specialized mobile application that the recipient has access to, or via any other suitable method known in the art or to be discovered. The encoded container containing the package may be repositioned within the package receiving station for efficiency, and to free up the package receiving area and/or container loading/unloading area of the package receiving station to allow reception of other packages.

Upon receiving the notification of package intake, the recipient may initiate delivery to the recipient or elect to have the package receiving station store the package for a period of time. The transmission o the notification and recipient's choice may be logged and recorded in a database. If a user initiates or schedules a delivery, the package station subsystem may initiate a delivery with an available delivery robot or reserve a delivery robot for the date and time of delivery selected by the user. Alternatively, if the recipient elects to have the package receiving station store the package, the package receiving substation may reposition the encoded container within the package receiving station for efficiency responsive to the amount of time the user asks the station to store the package. In some embodiments, the package receiving station may be configured with a maximum storage time for packages. The package station subsystem may initiate reminder notifications periodically or at pre-defined moments prior to the expiration of the maximum storage time. The notifications may include a warning that the package will be destroyed or disposed of if the user does not schedule a delivery prior to the expiration of the maximum storage time. If the package delivery is not scheduled, the package delivery station may initiate destruction or disposal of the package coordinating delivery to a destruction or disposal location via delivery robot, or directly if the package receiving station is connected to such a location. The package delivery station 21 may alternatively communicate with the front desk regarding an unclaimed package and either deliver the package to the front desk for storage in an alternative location, or move the package to the package receiving area 212 where front desk personnel may retrieve the package and move it to the alternate storage area in the building.

An encoded container subsystem 22 may have a storage space for receiving a package, and an identifier 225. The identifier 225 may be an RFID, a QR Code, a ID number, or any other suitable identifier known in the art or to be developed. As discussed above, in some embodiments the encoded container may include sensors, such as a load sensor, laser sensors, a water or liquid sensor, and other specialized sensors to assist the package station in validation.

The package delivery robot 23 may be an autonomous robot the delivery robot may have sensors, cameras, a processor, memory, motors, a control system and a transmitter for communicating with the robot control subsystem 24, the elevator control subsystem 25, the elevator control occupancy subsystem 26, the video subsystem 27, and with a user's device 28.

The delivery robot 23 may include a power management system, a motion system, a navigation system, a package handling system, a security system, a maintenance and logging system, and a main control system. The power management system may include a battery and a battery management system, and may controls the energy level of the batteries (charge level), monitor and control the battery status (temperature, cell integrity, charge cycle number, operating time); the current flowing in or out of the battery; the time of use for the whole system according to the current load; and the hibernation, sleep and shutdown status of the battery. The power manager is controlled by a microprocessor that is responsible for carrying all the above functions and this microprocessor in turn is connected to the main microprocessor of the robot.

The delivery robot's 23 motion system may control the speed, acceleration, braking and direction and positional control of the robot. In one embodiment the system may have four wheels which have an independent motor for each wheel. The motion subsystem may also have a turning motor for each wheel, which is known as an in-wheel motor system that allows the robot to perform the following movements: forward and backward movements; movements to the right and to the left; rotate on its own central axis (360 degree movements); and diagonal movements. Each motor may have an independent microprocessor (motor controller) which allows to managing the following functions: control of current supplied to the motor: motor rotor temperature status; and rotor encoders to measure rotor RPM. The motors may be connected to a distribution system which distributes the current and the control information to each of the motors. This system is may be connected to the main microprocessor of the robot from where the control signals for the entire drive system may originate. This main microprocessor may in turn be connected to the robot's onboard computer. The motion system may have an emergency braking which is triggered in the following cases: an obstacle was detected within the robot's safety perimeter; communication between the main microprocessor and the onboard computer is lost an alarm was triggered in one of the motors (overheating, communication problem, overload, etc). The motion system may also controls the robot's brake lights.

The delivery robot's navigation system manages the robot's location, route and displacement by analyzing the signals and information inputs received by its sensors, including 3D cameras, LiDAR sensors, peripheral cameras, ultrasonic sensors and inertial measurement sensors (IMU). Other sensors known in the art or to be discovered may be used in accordance with the disclosed concepts. The navigation system positions the robot within a 3D map, which may be preloaded in the robot, compares the 3D map already preloaded with the 3D map it builds using localization, mapping and odometry algorithms. This allows it the navigation system to calculate and/or optimize the route from point the package receiving station 21 to the destination unit (such as a recipient's apartment). The destination unit may be defined within the 3D map preloaded in the system and an identification system (QR, RFID, TAG, etc) recognizable by the robot. The navigation system can create alternate routes if it encounters a problem on the current route and estimates the delivery time for a package.

The delivery robot's package handling system handles all the functions related to the loading and unloading of packages inside the delivery robot. It may work with a SmartBox encoded container 22 that is controlled by microcontrollers, motors and a variety of sensors which together may be in charge of controlling the following functions: a unique identification system 225 integrated in each SmartBox encoded container 22, whether through RFID, QR, TAG or any other suitable identifier; SmartBox encoded container 22 status monitoring (warning states, danger, etc); package disinfection functions (UV lights); the internal motors of the SmartBox and external motors of the Robot (SmartBox access door); and generation and communication of package status notifications (loading package, en route, making delivery, delivered).

The delivery robot may include a safety system that is responsible for monitoring the integrity of the robot at all times, monitoring each of the robot's subsystems and executing priority functions over the other systems. It may control the following functions:

maintaining a safe perimeter around the robot and thus avoiding collision with any obstacle (including controlling the robot's movement system to activate emergency braking);

monitoring the speed of the robot at all times to avoid an excessive increase caused by any external factor such as a person, a slip, an inclination, etc.;

monitoring the different sensors that are part of the navigation in case of a malfunction, which allows identification and notification of a possible failure, obstruction, or abnormal conditions (including malfunctioning or obstructed sensors) and take control measures (such as sending an emergency message or a request for help);

monitoring of the robot motors for possible overheating or malfunction that could cause damage to the motors;

monitoring and controling the battery system by constantly checking battery temperature, charge and voltage and sending alerts of any critical condition, failure or malfunction or taking emergency action (such as shutting down the battery or robot);

monitoring the inertia sensors (IMU) of the robot chassis to verify the stability of the robot, and sending alerts for irregular movement experienced by the chassis;

enabling or disabling the remote control of the robot, allowing the robot control system 24 to remotely manage the robot's movement system, and provide a visualization of the general status of all the robot's systems (batteries, cameras, sensors, navigation, location, etc);

The delivery robot's 23 maintenance and logging system is in charge of performing maintenance and updating tasks throughout the system, as well as keeping records of the different processes and eventualities of the system (updates, errors, critical events, etc.). It may also control uploading these logs to the system's database. This system may control the following: microcontroller firmware update; main operating system updates; updating the different modules/nodes of the main control software (ROS); maintaining an event record of updates, processes and errors; and managing external connections (including its connection interface with HDMI, USB, RJ45 ports, etc).

The delivery robot may include a main control system, such as a Robotic Operating System (ROS) which manages communicating between all the subsystems, manages the architecture of the processes of each subsystem and controls each one of them.

The SmartHub™ package receiving station 21, is designed for the collection and storage of packages automatically, it is part of the autonomous parcel ecosystem which stores, identifies, organizes and distributes packages within a residential or commercial building. It is designed to receive different types of packages with various sizes and weights. It makes use of various mechanical, electrical and electronic systems; in addition to sensors, cameras and a computer system for communication and control of all automated processes.

The package receiving station 21 may include the following subsytems: power management; user interface (GUI); package management; maintenance and logging system; and a main control system.

The power management subsystem controls the following functions: distribution of power output in varied voltages to the different electronic systems (motors, microcontrollers, sensors); managing a battery backup system in case of any external power failure; and protecting internal components from any surges that may be received from the building's power system.

The user interface subsystem may run a user interface on a tablet (such as iPad) managed by an application that is responsible for the entire process of interaction with users who wish to deliver or pick up a package from the robotic station.

The package management system controls of all the processes involved in package management. It performs the following functions: receiving and identifying new packages; storing and organizing the packages contained within the SmartBox; controling the delivery of each package; managing the status of packages (received, stored, delivered). The package system manages the interaction between the SmartBox encoded container 22, the delivery robot 23, the elevator system and the mobile applications of the different users (Apartment User, Front Desk User, Delivery User), it is in charge of tracking, control and status of all the processes involved in a package: since it is received in its first stage, it is stored in the package container (SmatBox), identified (RFID), registered in the main database and sent for delivery to a Robot Delivery. It is in charge of making control requests to the elevator system and manages the communication between the delivery robot and the elevator system. This system is in charge of notifying the user and the front desk of any problem that may occur with the delivery robot 23 at the time of delivery (obstruction in the robot's path, problems with the elevators, etc.) The storage, organization and delivery of packages is controlled by an ASRS (Automated storage and retrieval system), which takes care of the entire process of storage, organization and control of the SmartBoxes, which contain the user's packages.

The maintenance and logging system controls performing maintenance and updating tasks throughout the package receiving station 21, as well as keeping records of the different processes and eventualities of the system (updates, errors, critical events, etc.). Its functions include: microcontroller firmware update; updating of the main operating system; updating of the different modules/nodes of the main control software (ROS); updating of the database version; updating of the version of the iPad mobile application; and keeping a record of events, including updates processes and errors.

The robot control system 24 may be a Robotic Operation System (ROS) and may be in charge of communicating all the subsystems within the robotic station, manages the architecture of the processes of each subsystem and keeps control of each one of them. It may manage the main database of the entire environment which keeps track of each of the processes involved in receiving a package, storing it, delivering it to a delivery robot and communicating its status to the user. The main control system is in charge of managing the communication between the delivery robots, the elevator control system and the mobile applications of the different users.

The SmartBox™ encoded container 22 may be an intelligent package container, designed for the storage of packages that may have different sizes and shapes, limited to a maximum weight. It may have a locking mechanism that allows it to keep safe any package inside. It may also has several sensors and microprocessors to manage the status of the packages in it. It may have a package disinfection mechanism which makes use of ultraviolet (UV) lights or a disinfectant spray automatically controlled by its internal microprocessor. This encoded container 22 may include the following subsystems: power management; package handling (loading/unloading of packages); package disinfection; security system; maintenance and logging system; and the main control system (RTOS).

The power management system is responsible for receiving energy from the delivery robot or the robotic station depending on the case where it is connected; this energy is distributed among the different internal components such as motors, sensors, UV lights, etc, at different voltages according to the requirement of each of the components.

The package handling system for loading and unloading packages may have a microprocessor that is in charge of controlling the motor system, which manages the opening and closing of the doors. This microprocessor is also in charge of controlling the different internal sensors in the SmartBox encoded container 22, such as the laser sensor located inside, which verifies that the size of the packages does not exceed the maximum height to allow the door to close. The SmartBox encoded container may be designed with an internal cavity located at the bottom, which has the purpose of storing any liquid that may spill inside, it also has a liquid absorption system (Spill Pads) that contains multiple water sensors controlled by the microprocessor, in charge of notifying if any liquid has been spilled inside the SmartBox. It also has a radio frequency identifier (RFID) 225 or another unique identifier 225 (QR code, TAG, etc) which allows each SmartBox encoded container 22 to be specifically identified and associated to a package for a user.

The package disinfection system may include several ultraviolet (UV) lights and temperature sensors connected to the microprocessor, which may be activated after receiving a package and closing the SmartBox door. This system controls the exposure time of the package to the ultraviolet lights to ensure the best disinfection of the package, and also verifies the internal temperature of the SmartBox.

The security system may be responsible for monitoring the integrity of the SmartBox encoded container 22 at all times, monitoring each of its subsystems and executing priority functions over the other systems. It may control the following functions:

liquid spill control (constantly monitoring the water sensors located on the SmartBox internal cavity pad to notify of a possible spill that exceeds the allowed limit and may damage the SmartBox contents);

temperature control, monitoring the internal temperature of the SmartBox. It alerts of any very high or low temperature variation;

stability control, monitoring the SmartBox inertial sensors (IMU) to verify the stability of the SmartBox, and alerting for any irregular movement experienced by the SmartBox;

object control, verifying the presence of objects inside the SmartBox, it is in charge of validating that there are no objects inside the SmartBox after the delivery of a package and alertsing if any object is left inside the SmartBox—this process allows cleaning tasks to be performed.

The maintenance and logging system is in charge of performing maintenance and updating tasks in all SmartBox subsystems, as well as keeping records of the different processes and eventualities of the system (updates, errors, critical events, etc). This includes the following functions: microcontroller firmware update; ad event logging, including updates, processes and errors.

The main control system is in charge of managing all the internal subprocesses and controls the execution of each of the processes and subprocesses of the whole system. This system is known as a real-time operating system (RTOS).

The elevator control system 25 may be any third-party application that can be used to electronically control the elevators, including opening the doors for the robot and directing the elevator to a particular floor, to facilitate the delivery robot's 23 navigation along its route. It may be advantageous to use a system that can track information about elevator usage and scheduling, to further inform the delivery robot 23 or the robot control subsystem 24 regarding status of the elevators. Such systems may be controlled by the robot control subsystem 24. The elevator control subsystem may be provided with a processor, memory, and a nontransitory medium storing instructions that when executed by the processor allow it to control the elevators, and communicate with the robot control subsystem (for example wirelessly via an API). In some implementations, the elevator control subsystem may be able to track and predict elevator availability and provide the delivery robot 23 and/or the robot control subsystem 24 with a suggestion for what elevator should be used for a delivery route.

The elevator occupancy subsystem may process images taken from inside the elevators to determine the occupancy and availability of space for a delivery robot. This system may include one or more cameras in the elevators, or may interface with the cameras of a camera subsystem 27, and may have a processor and memory and a nontransitor storage medium storing instructions that when executed by the processor can run image processing algorithms to analyze the contents of the images of the interior of the elevators to determine the occupancy of same and whether the elevators have free space that would accommodate a robot and what the ideal position inside. Any suitable image processing algorithm known in the art or to be developed may be used by the elevator control occupancy system. In some implementations the elevator control occupancy sub system 26 may be part of, or integrated with, the elevator control system 25 and/or the camera subsystem 27. The elevator control occupancy subsystem may include a power management module that tracks the voltage and power of each of the electrical components to ensure that they are in proper working order.

The wireless communication system 29 may manage the wireless communication between all the systems that make up the automated package system 20. The wireless communications system 29 may include of several data reception and transmission points (such as beacons) which allow total communication throughout the building. The wireless communication system may be implemented with wireless, radio, or cellular communication, or any other wireless technology known in the art or to be developed. This system may also serve as a navigation beacon for the delivery robot 23 to assist in tracking its progress through the delivery route.

The user devices 28 may include a specialized application on a recipient's mobile device, a website providing access to communicate with the delivery systems, or a specialized terminal in the building unit, or any other suitable electronic communications format to facilitate the user's interaction with the system. Through such applications, websites, terminals or other devices, a user can manage and control the delivery of packages to their respective unit. These applications may be implemented to run on iOS, Android, Windows and any other suitable operating system. These applications allow the user to receive notifications and provide instructions, including scheduling deliveries, tracking the progress of a delivery, and verifying user identity, etc. Additional features providing ease of use and quality of life conveniences, including integration of the system with courier or USPS delivery tracking systems, and any other such conveniences known in the art or to be developed are contemplated within the scope of the disclosed concepts.

The components of the system for delivering a package 20 may also be used in a system for sending a package. A user could use the app on their respective mobile device 28 to coordinate a package pickup, specifying the packages data (size, weight, special instructions, recipient or courier information, etc.). The robot control subsystem 24 may then direct a delivery robot 23 to travel to the user's unit with an encoded container 22. When the delivery robot 23 arrives, the user may verify their identity with the delivery robot and/or the encoded container, in order to gain access to the storage compartments 220, 230. The user may then place the package in the encoded container 22 inside of the delivery robot 23 (or directly inside of the delivery robot if there will be no validation until later). If an encoded container is used the encoded container may be used to validate and confirm the package data provided by the user. Any deviations from the information provided by the user may be reported to the user via the mobile device 28 app, so that the user may confirm the validation. If validation succeeds, the user may be provided with a confirmation notification via the app on their mobile device 28. If the package is to be delivered internally within the building, the delivery robot 23 or the robot control system 24, coordinating with elevator control 25 and/or elevator occupancy 26, may plan a route to the recipient's unit. If the delivery is to be made outside of the building the delivery robot 23 or the robot control system 24 may then plan a route to the package receiving station 21 in a manner similar to that described above. The package receiving station 21 may then receive the package in robot loading & unloading area 216, store it in temporary storage 215 or long-term storage 217, depending on when a package pickup is expected. When the selected courier arrives to pick up the package they may input a confirmation number or provide other suitable verification via the input 211 in response to prompts displayed on the display 210 via a graphical user interface. Once the courier is verified, the package may be routed within the package receiving station from storage 215, 217 container loading/unloading area to be removed from the encoded container 22 and transported to the package reception area 212. Alternatively, the package and the encoded container 22 may be routed to the package reception area 212, where the courier may obtain the package from within the encoded container 22.

In certain embodiments, the disclosed concepts can be implemented with a package receiving station that is a kiosk that does not have any storage or package manipulation capabilities. The package receiving station/kiosk 21 may include a display 210, an input device 211 and a computing device 219. The package receiving station/kiosk 21 may present a delivery person with a request for package information on a display 210 via a graphical user interface. The display 210 and input device 211 may be any of the devices described above, including but not limited to a touch screen which acts as both an input and a display. The delivery person may then input the package information to the package receiving station/kiosk. The robot control system 24, which may reside on the computing device 219 or elsewhere in the system, may route a delivery robot 23 to the package receiving station/kiosk 21 to receive the package being delivered. The delivery robot 23 may then verify the package information, as described above. Alternatively, the delivery robot may be provided with an encoded container 22, which may receive and validate the package, as described above. In such implementations, the delivery robot may act as preliminary storage for the package. The control system 24 may then attempt to coordinate a delivery with the recipient. If a delivery is scheduled, it may proceed as described above. If delivery is not scheduled within a specified time threshold, the control system may notify a human worker of a package that needs to be moved from the delivery robot 23 to the building's long term package storage facilities. When a delivery is later scheduled for that package, the human worker may reload the package onto a delivery robot from the building's long term package storage facility, and the delivery can proceed as described above.

Figure 10:
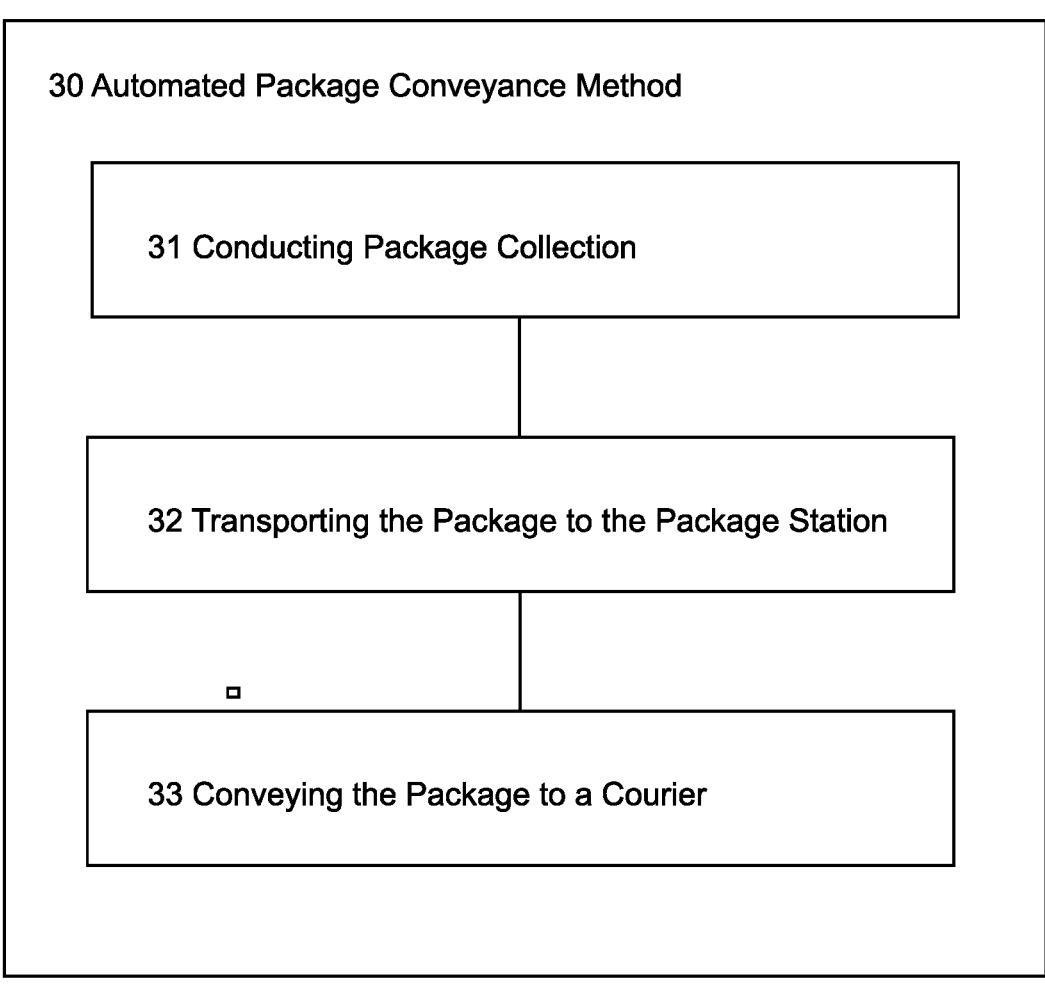
FIG. 10 illustrates a flow diagram for a method for conveying a package.

FIGS. 10-13 illustrate an exemplary method for conveying a package 30. As shown in FIG. 10, the method 30 may include: conducting package collection 31; delivering the package to the package station 32; and conveying the package to a courier. FIG. 11 illustrates a method for collecting a package 31. The method may include: receiving a request for a package collection 310; sending a delivery robot to collect the package 311; receiving the package 312; validating the package information 313; and confirming package collection 314.

Receiving a request for package collection 310 may respond receiving a communication from a user or building resident to pick up a package at their respective building unit for conveyance to a courier via the package station 21. The user may use an app on a computing device 28 to send the package collection request and to provide package information, such as size, weight and courier information, and any other special information relevant to the package they wish to send. Sending a delivery robot to collect the package 311 may follow the same methods described above with respect to FIG. 4, including selecting a suitable delivery robot 130, calculating a route to the user's unit (similar to calculating a delivery route 132); navigating the delivery route 133, including communicating with elevator control 134, and updating the delivery route 135, and communicating the arrival of the delivery robot 23 to the user (similar to communicating with the Recipient that the delivery is ready 136). Receiving the package 312 may include providing the user with access to a storage compartment 230 of a delivery robot 23, or to an encoded container 22 within the storage compartment 230 of the delivery robot 23 to allow the user to place user into the delivery robot 23 and/or the encoded container 22. Validating the package 313 may include using sensors to measure and verify the package information provided by the user, including the size and the weight of the package. It may take place in the storage compartment 230 of the delivery robot 23 or in the encoded container 22. In some implementations, validation may be delayed until the package arrives at the package station 21. Confirming package collection 314 may be done through sending the user a message via the app on their computing device 28, via email, SMS message or other electronic messaging system, and/or the confirmation may be displayed on the display 231 of the delivery robot 23. Multiple forms of confirmation may be utilized.

Figure 12:
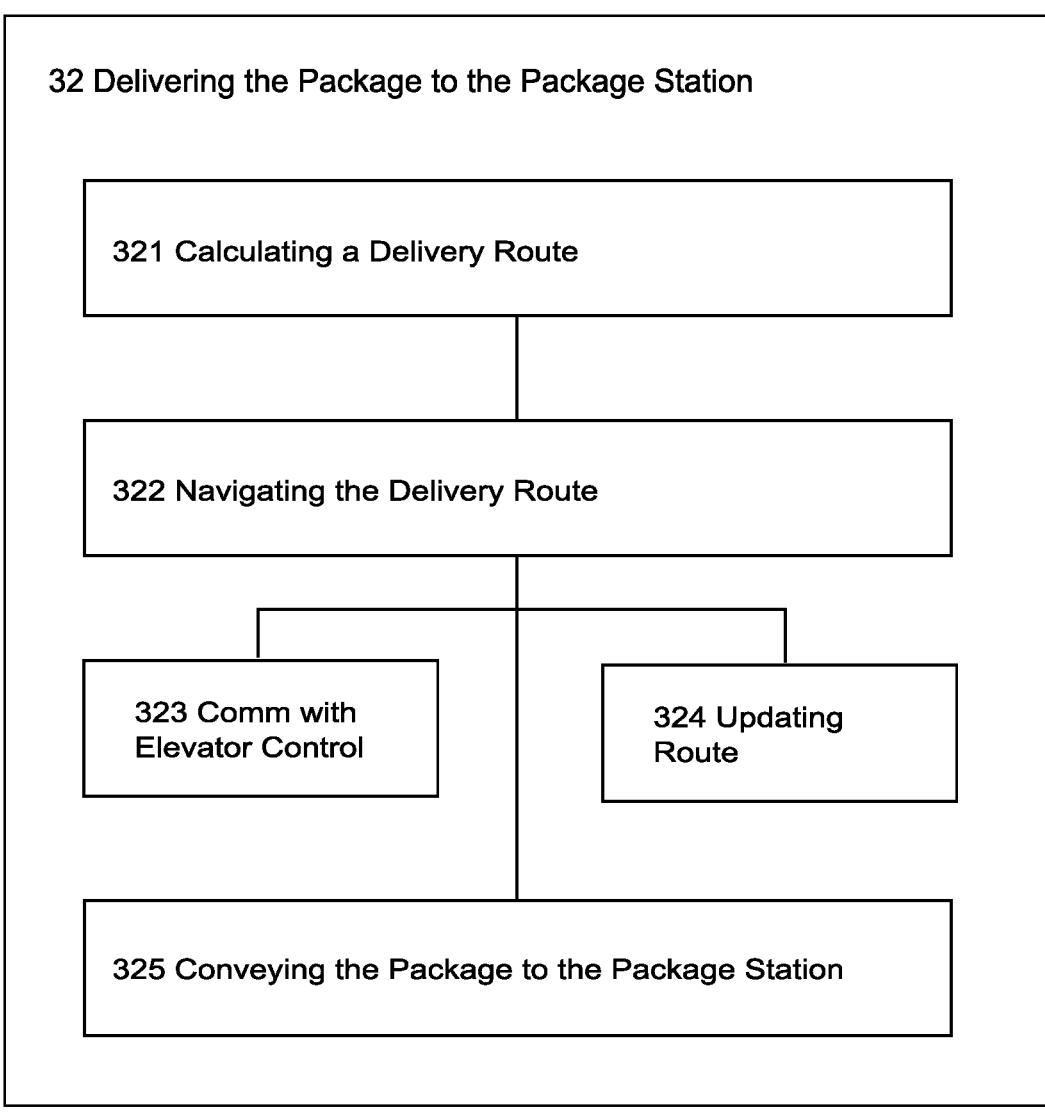
FIG. 12 illustrates a flow diagram for a method for delivering a package to the package station.

FIG. 12 illustrates a method for delivering the package to the package station 32. Delivering the package to the package station 32 may include calculating a delivery route to the package station 321; navigating the delivery route 322; communicating with elevator control 323; updating the delivery route 324; and conveying the package to the package station 325.

Calculating the delivery route 321 is analogous to calculating the delivery route 132 described above in connection with FIG. 4, except that the starting point is the user's unit, and the end point is the package station 21. Similarly, navigating the delivery rotue 322 is analogous to navigating the delivery route 133 described above in connection with FIG. 4. Communicating with elevator control 323 and updating the delivery route 324 are analogous to communicating with elevator control 134, and updating the delivery route 135, respectively, as described above in connection with FIG. 4. Conveying the package to the package station 325 may include having the delivery robot 23 enter the robot loading/unloading location 216 of the package station 21 and providing access to the storage compartment 230 and/or the encoded container 22 so that the package manipulation devices 218, such as a robot arm may retrieve the package from the delivery robot 23 into the package station 21.

Figure 13:
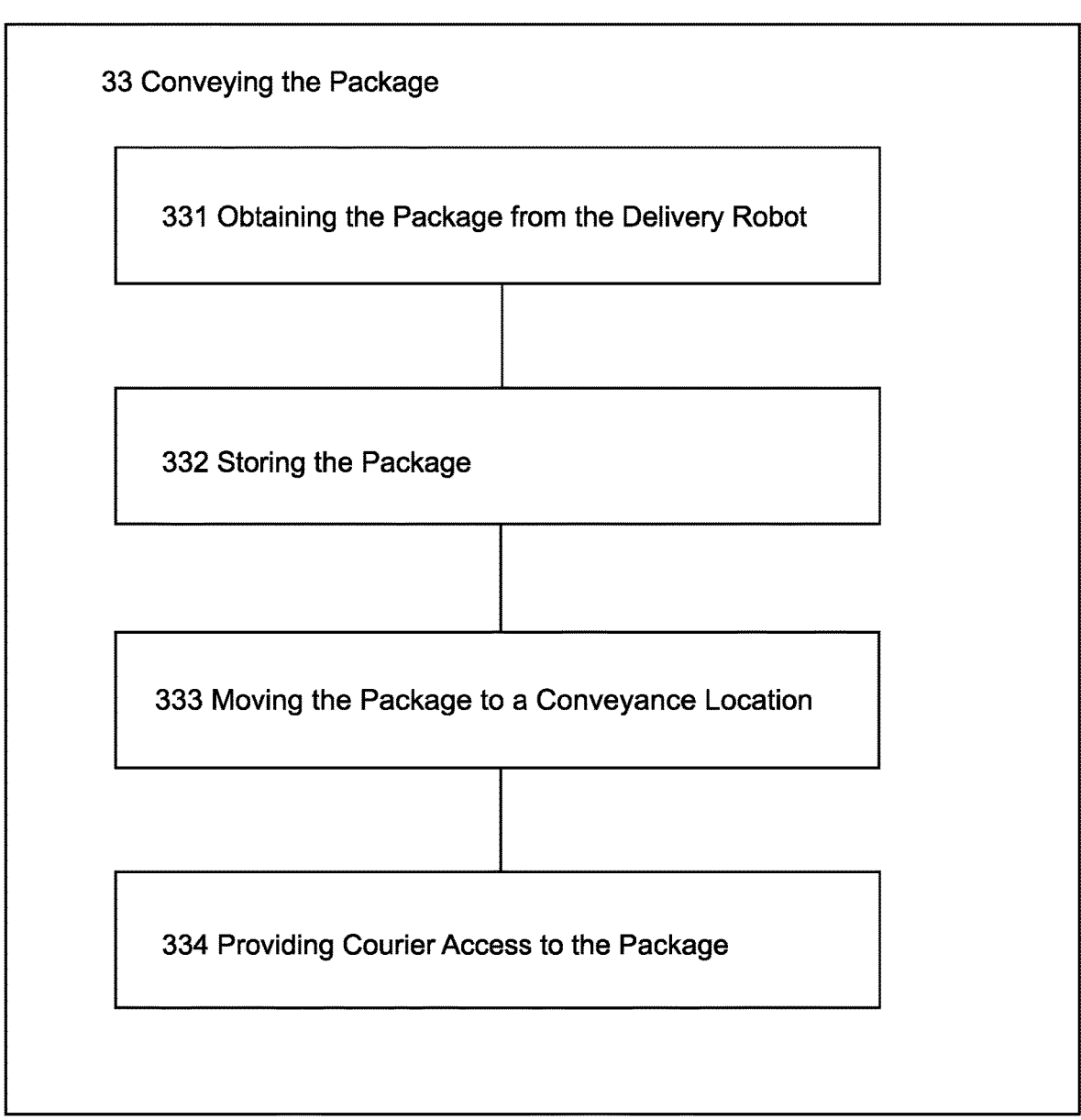
FIG. 13 illustrates a flow diagram for a method for conveying the package.

FIG. 13 illustrates a method for conveying the package to a courier 33. Conveying the package to a courier 33 may include: obtaining the package from the delivery robot 331; storing the package 332; moving the package to a conveyance location 333; and providing a courier access to the package 334.

Obtaining the package from the delivery robot 331 may include using a package maniupulation device, such as a robot arm and/or conveyor belts, to retrieve the package and/or the encoded container containing the package from the delivery robot. If the package has not been validated, a package validation procedure may be run at this time within the packaging station, or the package and/or encoded container 22 may be conveyed to a validating are 213 or other suitable location within the package station 21 where validation may take place. Storing the package 332 may include conveying the package to package receiving/conveyance area 212, to preliminary storage 215, or to long term storage 217, or any other suitable storage location within the package station 21. The package station subsystem 21 may elect which storage area 212, 215, 217 to use based on the expected pick up time for the selected courier for the package. The package station subsystem 21 may also communicate with the courier company to notify them that the package has been collected and is awaiting pickup. Moving the package to a conveyance location 333 is an optional method that may be performed when the package is not already stored in a package receiving/conveyance area 212 already. The package station may utilize one or more package manipulation devices 218 to move the package from long term storage 217 or preliminary storage 215 to a package receiving/conveyance location 212 where a chosen courier can pick up the package. Moving the package to a conveyance location 333 may be initiated in anticipation of when the selected courier is expected to arrive at the package station 21, or responsive to the selected courier arriving and interacting with the package station 21 in order to collect the package. Providing the courier with access to the package 334 may include having the courier log in to the package station and provide identifying credentials, such as a pass code or ID badge to verify that they are authorized to collect the package, providing the courier access to the package conveyance location 212 where the package and/or the encoded container 22 is located, and/or unlocking the encoded container 22 so that the authorized courier may remove the package from same. Upon conveyance of the package to the courier, the system may send confirmation messages to the user and/or to the courier via applications on their respective computing devices.

As described above, each step in the process of conveying the package may be logged in the database by the respective subsystems responsible for that step. Video and/or still image photographs may be taken and stored as evidence of each such steb being completed successfully in the database or in a separate image database.

As discussed above, the disclosed concepts may also be implemented with a package receiving station that is a kiosk that does not have internal storage or package manipulation equipment. For example, the robot control system may route a delivery robot 23 to a tenant's unit to pick up a package, as described above. Any necessary package validation may take place in the delivery robot 23, or in an encoded container 22 carried by the delivery robot 23. The package may then remain in storage in the delivery robot 23 until it is picked up by a courier, or may be placed in longer term storage by a human worker until a courier is scheduled to pick it up. In the latter case, when pickup is scheduled the human worker may re-load the package into the delivery robot 23 for delivery to the courier. A courier may interact with the package receiving station/kiosk 21 as described above to verify their identity and the information on the package they are picking up.

Persons of skill in the art will recognize that any of the features of the disclosed concepts may be implemented with any suitable building package delivery system independently or in conjunction with other features, within the scope of the disclosed concepts.

While specific embodiments have been discussed to illustrate the invention, it will be understood by those skilled in the art that the descriptions herein are intended as illustrative, and not as limiting, and that variations in the embodiments can be made without departing from the spirit of the invention. Accordingly, the foregoing descriptions are intended as illustrative, and not as limiting.

We claim:

1. A system for receiving and delivering packages to a building comprising:
   a package receiving station capable receiving and storing packages, the package receiving station comprising a display, an input device, a package receiving area, a robot loading area, at least one package manipulation device, and a computing device;
   a delivery robot capable of interacting with the package receiving station to receive packages to be delivered; and
   a control system;

wherein the package receiving station is capable of receiving a package at the package receiving area, and moving the package to the robot loading area and loading the package onto the delivery robot with the at least one package manipulation device; and wherein the control system is capable of notifying a recipient of the arrival of the package; coordinating a delivery time with the recipient, and initiating a package delivery whereby the package is loaded onto the delivery robot by the package receiving station, and the delivery robot travels to a delivery location within the building and delivers the package;

wherein the package receiving station further comprises a validating area, wherein the package intake further comprises validating the package information, wherein the validating area validates the package by employing water sensor to ascertain whether the package is in a suitable condition.

2. The system of claim 1 wherein the control system is disposed within the computing device of the package receiving station.

3. The system of claim 2 wherein the control system is separate from the package receiving station and is capable of communicating with the package receiving station to initiate a package delivery.

4. The system of claim 1 wherein the package receiving station performs a package intake comprising obtaining package information and receiving the package.

5. The system of claim 1 the package receiving station further comprises a container loading area wherein received packages can be loaded into containers to facilitate delivery.

6. The system of claim 5 wherein the container loading area and the robot loading area are in separate locations within the package receiving station.

7. The system of claim 5 further comprising an encoded container, comprising a storage area, an access door and an identifier.

8. The system of claim 7 wherein the encoded container further comprises disinfectant devices.

9. The system of claim 5 wherein the encoded container further comprises sensors that may assist in validating package information when the package is undergoing a package intake.

10. The system of claim 1 the package receiving station may further comprise a preliminary storage location and a long-term storage location, such that received packages that are recently received are kept in the preliminary storage location, and such that received packages for which delivery has failed or has not been scheduled within a threshold time are stored in long-term storage.

11. The system of claim 1 further comprising an elevator control subsystem capable of controlling at least one elevator in the building, in order to enable the delivery robot to travel between floors of the building.

12. The system of claim 11 further comprising an elevator occupancy subsystem capable of monitoring usage and occupancy information of the at least one elevator.

13. The system of claim 12 wherein the elevator occupancy subsystem communicates the usage and occupancy information to the control system, and wherein the control system is capable of selecting a first elevator of the at least one elevator for the delivery robot to use.

14. The system of claim 1 wherein the delivery robot comprises:

a storage compartment having a compartment door capable of receiving a package to be delivered;

a display;

an input device;

sensors; and an on-board computing device.

15. The system of claim 14 wherein the delivery robot is capable of requesting verification information from the recipient prior to providing the recipient with access to the package and wherein the recipient may enter the verification information using the input device on the delivery robot.

16. The system of claim 14 wherein the delivery robot is capable of autonomous movement and is capable of calculating and altering its own route to the delivery location.

17. The system of claim 1 wherein the control system is further capable of scheduling an outgoing package delivery with a tenant of the building, such that the control system schedules an outgoing package pickup, and routes a delivery robot to the tenant's unit for a package pickup; and wherein the package receiving station is further capable of:

receiving an outgoing package at the robot loading area;

moving the outgoing package to a package pickup area, which may be the same or different as the package receiving area; and delivering the outgoing package to a courier for delivery to a second recipient.

18. A system for receiving, delivering and sending out packages from a building comprising:

a package receiving station capable receiving and storing packages, the package receiving station comprising a display, an input device, a package receiving area, a robot loading area, at least one package manipulation device, and a computing device;

a delivery robot capable of interacting with the package receiving station to receive packages to be delivered; and a control system;

wherein the package receiving station is capable of receiving a package at the package receiving area, and moving the package to the robot loading area and loading the package onto the delivery robot with the at least one package manipulation device;

wherein the control system is capable of notifying a recipient of the arrival of the package; coordinating a delivery time with the recipient, and initiating a package delivery whereby the package is loaded onto the delivery robot by the package receiving station, and the delivery robot travels to a delivery location within the building and delivers the package;

wherein the package wherein the package receiving station is further capable of receiving an outgoing package at the robot loading area, moving the outgoing package to a package pickup area, which may be the same or different as the package receiving area, and delivering the outgoing package to a courier for delivery to a second recipient; and wherein the control system is further capable of scheduling an outgoing package delivery with a tenant of the building, such that the control system schedules an outgoing package pickup, and routes a delivery robot to the tenant's unit for a package pickup; and wherein the package receiving station further comprises a validating area, wherein the package intake further comprises validating the package information, wherein the validating area validates the package by employing water sensor to ascertain whether the package is in a suitable condition.

19. A system for receiving and delivering packages to a building comprising:

a package receiving kiosk capable receiving and storing
   packages, the package receiving station comprising a
   display, an input device, and a computing device;
a delivery robot capable of receiving packages to be
   delivered; and
a control system;
wherein the package receiving station is capable of dis-
   playing a request for package information for a first
   package on the display, and receiving package infor-
   mation via the input device;
wherein the control system is capable routing the delivery
   robot to receive the first package, coordinating a deliv-
   ery time with the recipient, and initiating a package
   delivery whereby the delivery robot travels to a deliv-
   ery location within the building and delivers the pack-
   age; and
wherein the package receiving station further comprises a
   validating area, wherein the package intake further
   comprises validating the package information, wherein
   the package is validated by
   verifying a unit identifier within the building,
   verifying the identity of the recipient against a list of
      authorized recipients,
   verifying the size of the package,
   verifying whether the package is fragile,
   verifying whether the package requires environmental
      controls,
   employing water sensor to ascertain whether the pack-
      age is in a suitable condition,
   utilizing x-rays on the package,
   utilizing metal detectors on the package, and
   utilizing dangerous chemical detectors.

* * * * *